(12) United States Patent
Wheeler et al.

(10) Patent No.: US 11,427,757 B2
(45) Date of Patent: Aug. 30, 2022

(54) PEROVSKITE MATERIALS AND METHODS OF MAKING THE SAME

(71) Applicant: Alliance for Sustainable Energy, LLC, Golden, CO (US)

(72) Inventors: Lance Michael Wheeler, Golden, CO (US); Nathan Richard Neale, Denver, CO (US); Nicholas Charles Anderson, Dallas, TX (US); Matthew Peter Hautzinger, Arlington Heights, IL (US); Taylor Sierra Bliss, Jacksonville, FL (US)

(73) Assignee: Alliance for Sustainable Energy, LLC, Golden, CO (US)

(*) Notice: Subject to any disclaimer, the term of this patent is extended or adjusted under 35 U.S.C. 154(b) by 630 days.

(21) Appl. No.: 16/271,358

(22) Filed: Feb. 8, 2019

(65) Prior Publication Data
US 2019/0241802 A1    Aug. 8, 2019

Related U.S. Application Data

(60) Provisional application No. 62/628,151, filed on Feb. 8, 2018.

(51) Int. Cl.
| | | |
|---|---|---|
| *C09K 11/66* | (2006.01) | |
| *C01G 21/16* | (2006.01) | |
| *C01G 21/00* | (2006.01) | |
| *C09K 11/06* | (2006.01) | |
| *C07F 7/24* | (2006.01) | |

(52) U.S. Cl.
CPC .......... *C09K 11/665* (2013.01); *C01G 21/006* (2013.01); *C01G 21/16* (2013.01); *C07F 7/24* (2013.01); *C09K 11/06* (2013.01); *C01P 2002/34* (2013.01); *C01P 2002/72* (2013.01); *C01P 2002/82* (2013.01); *C01P 2004/04* (2013.01)

(58) Field of Classification Search
None
See application file for complete search history.

(56) References Cited

U.S. PATENT DOCUMENTS

2015/0129034 A1    5/2015   Snaith et al.
2015/0340632 A1*   11/2015  Etgar .................. H01L 51/0032
                                                         136/255

(Continued)

FOREIGN PATENT DOCUMENTS

| WO | 2017043084 A1 | 3/2017 |
| WO | 2019050906 A1 | 3/2019 |

OTHER PUBLICATIONS

Akkerman, Q. et al., "Tuning the Optical Properties of Cesium Lead Halide Perovskite Nanocrystals by Anion Exchange Reactions," Journal of the American Chemical Society, vol. 137, 2015, pp. 10276-10281.

(Continued)

*Primary Examiner* — Clinton A Brooks
(74) *Attorney, Agent, or Firm* — Michael A. McIntyre

(57) ABSTRACT

The present disclosure relates to a perovskite sheet that includes two outer layers, each including A'X'; and a first layer that includes $BX_2$, where B is a first cation, A' is a second cation, X is a first anion, X' is a second anion, and the first $BX_2$ layer is positioned between the two outer layers.

21 Claims, 12 Drawing Sheets

(56) References Cited

U.S. PATENT DOCUMENTS

| | | |
|---|---|---|
| 2017/0186559 A1 | 6/2017 | Zhu et al. |
| 2017/0321117 A1 | 11/2017 | Weidman et al. |
| 2018/0166504 A1 | 6/2018 | Kamino et al. |
| 2020/0090876 A1 | 3/2020 | Zhu et al. |

OTHER PUBLICATIONS

Ahmad, S. et al., "Rapid development in two-dimensional layered perovskite materials and their application in solar cells," Chinese Chemical Letters, vol. 29, 2018, pp. 657-663.

Balakrishnan, S. et al., "Ligand Assisted Transformation of Cubic CsPbBr3 Nanocrystals into Two-Dimensional CsPb2Br5 Nanosheets," ACS Chem Materials, vol. 30, 2018, pp. 74-78.

Chen, Y. et al., "2D Ruddlesden-Popper Perovskites for Optoelectronics," Advanced Materials, vol. 30, 2018, 15 pages.

Cheng, Z. et al., "Layered organic-inorganic hybrid perovskites: structure, optical properties, film preparation, patterning and templating engineering," RSC CrystEngComm, vol. 12, 2010, pp. 2646-2662.

De Roo, J. et al., "Highly Dynamic Ligand Binding and Light Absorption Coefficient of Cesium Lead Bromide Perovskite Nanocrystals," ACS Nano, vol. 10, 2016, pp. 2071-2081.

Di Stasio, F. et al., "Near-Unity Photoluminescence Quantum Yield in CsPbBr3 Nanocrystal Solid-State Films via Postsynthesis Treatment with Lead Bromide," Chemistry of Materials, vol. 29, 2017, pp. 7663-7667.

Elbaz, G. et al., "Unbalanced Hole and Electron Diffusion in Lead Bromide Perovskites," Nano Letters, vol. 17, 2017, pp. 1727-1732.

Eperon, G. et al., "B-Site Metal Cation Exchange in Halide Perovskites," ACS Energy Letters, vol. 2, 2017, pp. 1190-1196.

Hassan, Y. et al., "Structure-Tuned Lead Halide Perovskite Nanocrystals," Advanced Materials, vol. 28, 2016, pp. 566-573.

Hills-Kimball, K. et al., "Synthesis of formamidinium lead halide perovskite nanocrystals through solid-liquid-solid cation exchange," Journal of Materials Chemistry C, vol. 5, 2017, pp. 5680-5684.

Jiang, J. et al., "Stabilizing Lead-Free All-Inorganic Tin Halide Perovskites by Ion Exchange," Journal of Physical Chemistry C, vol. 122, 2018, pp. 17660-17667.

Li, Y. et al., "Synthesis, structure and optical properties of different dimensional organic-inorganic perovskites," Solid State Sciences, vol. 9, 2007, pp. 855-861.

Li, Z. et al., "Stabilizing Perovskite Structures by Tuning Tolerance Factor: Formation of Formamidinium and Cesium Lead Iodide Solid-State Alloys," Chemistry Materials, vol. 28, 2016, pp. 284-292.

Liu, Z. et al., "Ligand Mediated Transformation of Cesiium Lead Bromide Perovskite Nanocrystals to Lead Depleted Cs4PbBr6 Nanocrystals," Journal of the American Chemical Society, vol. 139, 2017, pp. 5309-5312.

Mefford, J. et al., "Anion charge storage through oxygen intercalation in LaMnO3 perovskite pseudocapacitor electrodes," Nature Materials, vol. 13, Jul. 2014, pp. 726-732.

Mitzi, D.B. et al., "Conducting Layered Organic-Inorganic Halides Containing (110)-Oriented Perovskite Sheets," Science, vol. 267, Mar. 10, 1995, 5 pages.

Mitzi, D.B., "Synthesis, Structure, and Properties of Organic-Inorganic Perovskites and Related Materials," Progress in Inorganic Chemistry, vol. 48, 1999, 121 pages.

Mitzi, D.B. et al., "Organic-inorganic electronics," IBM Journal of Research and Development, vol. 45, No. 1, Jan. 2001, pp. 29-45.

Nazarenko, O. et al., "Luminescent and Photoconductive Layered Lead Hallide Perovskite Compounds Comprising Mixtures of Cesium and Guanidinium Cations," Inorganic Chemistry, vol. 56, 2017, pp. 11552-11564.

Nedelcu, G. et al., "Fast Anion-Exchange in Highly Luminescent Nanocrystals of Cesium Lead Halide Perovskites (CsPbX3, X = Cl, Br, I)," Nano Letters, vol. 15, 2015, pp. 5635-5640.

Nieuwenkamp W. et al., "Die Kristallstruktur von Bleibromid PbBr2," Zeitschrift fur Kristallographie—Crystalline Materials, vol. 84, 1933, 13 pages.

Nenon, D. et al., "Structural and chemical evolution of methylammonium lead halide perovskites during thermal processing from solution," Energy & Environmental Science, vol. 9, 2016, pp. 2072-2082.

Palazon, F. et al., "Postsynthesis Transformation of Insulating Cs4PbBr6 Nanocrystals into Bright Perovskite CsPbBr3 through Physical and Chemical Extraction of CsBr," Energy Letters, vol. 2, 2017, pp. 2445-2448.

Protesescu, L. et al., "Nanocrystals of Cesium Lead Halide Perovskites (CsPbX3, X = Cl, Br, and I): Novel Optoelectronic Materials Showing Bright Emission with Wide Color Gamut," Nano Letters, vol. 15, 2015, pp. 3692-3696.

Saidaminov, M. et al., "Low-Dimensional-Networked Metal Halide Perovskites: The Next Big Thing," ACS Energy Letters, vol. 2, 2017, pp. 889-896.

Sakata, M. et al., "Neutron Diffraction Study of the Structure of Cubic CsPbBr3," Journal of the Physical Society of Japan, vol. 47, No. 1, Jul. 1979, 2 pages.

Saparov, B. et al., "Organic-Inorganic Perovskites: Structural Versatility for Functional Materials Design," Chemical Reviews, vol. 116, 2016, pp. 4558-4596.

Slavney, A. et al., "Chemical Approaches to Addressing the Instability and Toxicity of Lead-Halide Perovskite Absorbers," Inorganic Chemistry, vol. 56, 2017, pp. 46-55.

Smith, I. et al., "Between the Sheets: Postsynthetic Transformations in Hybrid Perovskites," Chemical Materials, vol. 29, 2017, pp. 1868-1884.

Swarnkar, A. et al., "Quantum dot-induced phase stabilization of $\alpha$-CsPbI3 perovskite for high-efficiency photovoltaics," Science, vol. 354, Issue 6308, Oct. 7, 2016, 5 pages.

Tackett, J. E., "FT-IR Characterization of Metal Acetates in Aqueous Solution," Applied Spectroscopy, vol. 43, No. 3, 1989, pp. 483-489.

Tsunoda, Y. et al., "Intercalation Behavior of n-Alkylamines into a Protonated Form of a Layered Perovskite Derived from Aurivillius Phase Bi2SrTa2O9," Chemistry Materials, vol. 15, 2003, pp. 632-635.

Van der Stam, W. et al., "Highly Emissive Divalent-Ion-Doped Colloidal CsPb1—xMxBr3 Perovskite Nanocrystals through Cation Exchange," Journal of the American Chemical Society, vol. 139, 2017, pp. 4087-4097.

Wang, J. et al., "Engineered Directional Charge Flow in Mixed Two-Dimensional Perovskites Enabled by Facile Cation-Exchange," Journal of Physical Chemistry C, vol. 121, 2017, pp. 21281-21289.

Wheeler, L. et al., "All-Inorganic Germanium Nanocrystal Films by Cationic Ligand Exchange," Nano Letters, vol. 16, 2016, pp. 1949-1954.

Wheeler, L. et al., "Switchable photovoltaic windows enabled by reversible photothermal complex dissociation from methylammonium lead iodide," Nature Communications, vol. 8, 2017, 9 pages.

Xia, Y. et al., "Management of perovskite intermediates for highly efficient inverted planar heterojunction perovskite solar cells," Journal of Materials Chemistry A, vol. 5, 2017, pp. 3193-3202.

Yu, D. et al., "Cation Exchange-Induced Dimensionality Construction: From Monolayered to Multilayered 2D Single Crystal Halide Perovskites," Advanced Materials Interfaces, vol. 4, 2017, 7 pages.

Zhang, Z. et al., "A New Passivation Route Leading to Over 8% Efficient PbSe Quantum-Dot Solar Cells via Direct Ion Exchange with Perovskite Nanocrystals," Advanced Materials, vol. 29, 2017, 8 pages.

Zhou, Z. et al., "The fabrication of formamidinium lead iodide perovskite thin films via organic cation exchange," ChemComm, vol. 52, 2016, pp. 3828-3831.

Eperon et al., "Cation exchange for thin film lead iodide perovskite interconversion," RSC, Materials Horizons, vol. 3, 2016, pp. 63-71.

Quan, L. N. et al., "Ligand-Stabilized Reduced-Dimensionality Perovskites," Journal of the American Chemical Society, vol. 138, 2016, pp. 2649-2655.

(56) References Cited

OTHER PUBLICATIONS

PCT International Search Report dated Apr. 25, 2019 from corresponding PCT/US19/17312, 3 pages.
PCT Written Opinion of the International Searching Authority dated Apr. 25, 2019 from corresponding PCT/US19/17312, 4 pages.

* cited by examiner

US 11,427,757 B2

PEROVSKITE MATERIALS AND METHODS OF MAKING THE SAME

CROSS-REFERENCE TO RELATED APPLICATIONS

This application claims the benefit of U.S. Provisional Patent Application No. 62/628,151 filed Feb. 8, 2018, the contents of which are incorporated herein by reference in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

BACKGROUND

In less than a decade, metal halide perovskite semiconductors have risen to prominence as a material with unprecedented performance in optoelectronic technologies for photon conversion and emission. Thin film perovskite solar cells have reached stable solar power conversion efficiencies that rival conventional photovoltaic technologies, and the rapid development of perovskite nanocrystals have established these nanostructures as promising top cells of a tandem solar cell. Additionally, perovskite nanocrystals show narrow emission linewidths critical for lighting and display applications; provide the first example of a non-organic material with efficient triplet emission; and reportedly exhibit near-unity quantum yield (QY) even in the absence of complex, passivating shells typically required for high QY in metal chalcogenide and III-V nanocrystal emitter materials. However, there is a continued need for perovskite nanocrystals having improved physical properties and/or performance metrics, and methods for making such materials.

SUMMARY

An aspect of the present disclosure is a perovskite sheet that includes two outer layers, each including A'X'; and a first layer that includes $BX_2$, where B is a first cation, A' is a second cation, X is a first anion, X' is a second anion, and the first $BX_2$ layer is positioned between the two outer layers. In some embodiments of the present disclosure, the perovskite sheet may further include a first layer that includes AX and a second $BX_2$ layer, where A is a third cation, the second $BX_2$ layer is positioned between the outer layers, and the first AX layer is positioned between the first $BX_2$ layer and the second $BX_2$ layer. In some embodiments of the present disclosure, the perovskite sheet may further include a second AX layer, and a third $BX_2$ layer, where the second AX layer and the third $BX_2$ are positioned between the outer layers, each outer layer is adjacent to a $BX_2$ layer, and the $BX_2$ layers and AX layers alternate positions in the sheet. In some embodiments of the present disclosure, the perovskite sheet may further include n $BX_2$ layers, where n is greater than three, and the outer layers, the $BX_2$ layers, and the AX layers result in a stoichiometry defined by $A'_2A_{n-1}B_nX_{3n-1}X'_2$.

In some embodiments of the present disclosure, A may include at least one of an alkylammonium cation, formamidinium, $H^+$, and/or $Cs^+$. In some embodiments of the present disclosure, B may include at least one of lead, tin, and/or germanium. In some embodiments of the present disclosure, X may include at least one of fluorine, chlorine, bromine, and/or iodine. In some embodiments of the present disclosure, X' may include a charged form of at least one of a phosphonate group, a carboxylate group, a thiolate, a thiocyanate, an isocyanate, a carbonate, a chromate, a phosphate, a sulfite, a hydroxide, a nitrite, and/or a percholorate. In some embodiments of the present disclosure, X' may include at least one of acetate, propionate, butyrate, phenolate, formate, an alkylphosphonate, and/or an alkylthiolate. In some embodiments of the present disclosure, $4 \le n \le 10,000$.

In some embodiments of the present disclosure, the perovskite sheet may be a nanocrystal. In some embodiments of the present disclosure, the nanocrystal may be suspended in a solution comprising a solvent. In some embodiments of the present disclosure, the solution may further include a ligand having a binding group, where the binding group is physically associated with a surface of the nanocrystal. In some embodiments of the present disclosure, the nanocrystal may emit light when exposed to UV light. In some embodiments of the present disclosure, the light may be at an energy level between about 1.7 eV and about 3.0 eV.

An aspect of the present disclosure is a perovskite network that includes a first perovskite sheet having the stoichiometry of $A'_2A_{n-1}B_nX_{3n-1}X'_2$, and a second perovskite sheet having the stoichiometry of $A'_2A_{m-1}B_mX_{3m-1}X'_2$, where B is a first cation, A' is a second cation, A is a third cation, X is a first anion, and X' is a second anion, the first perovskite sheet and the second perovskite sheet each include an A'X' layer, the A'X' layer of the first perovskite sheet is physically associated with the A'X' layer of the second perovskite sheet, and m does not equal n, m is greater than or equal to zero, and n is greater than or equal to one.

An aspect of the present disclosure is a perovskite network that includes a first perovskite sheet having the stoichiometry of $A'_2A_{n-1}Pb_nBr_{3n-1}X''$, and a second perovskite sheet having the stoichiometry of $A'_2A_{m-1}Pb_mBr_{3m-1}X''$, where B is a first cation, A' is a second cation, A is a third cation, X is a first anion, and X'' is a second anion, the first perovskite sheet and the second perovskite sheet are physically associated by sharing at least one X'', and m does not equal n, m is greater than or equal to zero, and n is greater than or equal to one.

An aspect of the present disclosure is a method for making a perovskite, where the method includes removing A and X from a first nanocrystal comprising $ABX_3$, resulting in the forming of a second nanocrystal that includes $BX_2$, and contacting the second nanocrystal with A'X', resulting in the forming of third nanocrystal that includes $A'_2A_{n-1}B_nX_{3n-1}X'_2$, where B is a first cation, A' is a second cation, A is a third cation, X is a first anion, and X' is a second anion. In some embodiments of the present disclosure, the removing may be achieved by immersing the first nanocrystal in a first solution comprising a first solvent, the first solution may have a first solubility for the A and the X, the first solution may have a second solubility for the second nanocrystal, and the first solubility may be higher than the second solubility. In some embodiments of the present disclosure, the first solvent may include at least one of water, an alcohol, ether, a halogenated alkane, a halogenated benzene, a ketone, an alkylnitrile, and/or an ester.

BRIEF DESCRIPTION OF THE DRAWINGS

Embodiments are illustrated in referenced figures of the drawings. It is intended that the embodiments and figures disclosed herein are to be considered illustrative rather than limiting.

REFERENCE NUMBERS

Figure 1:
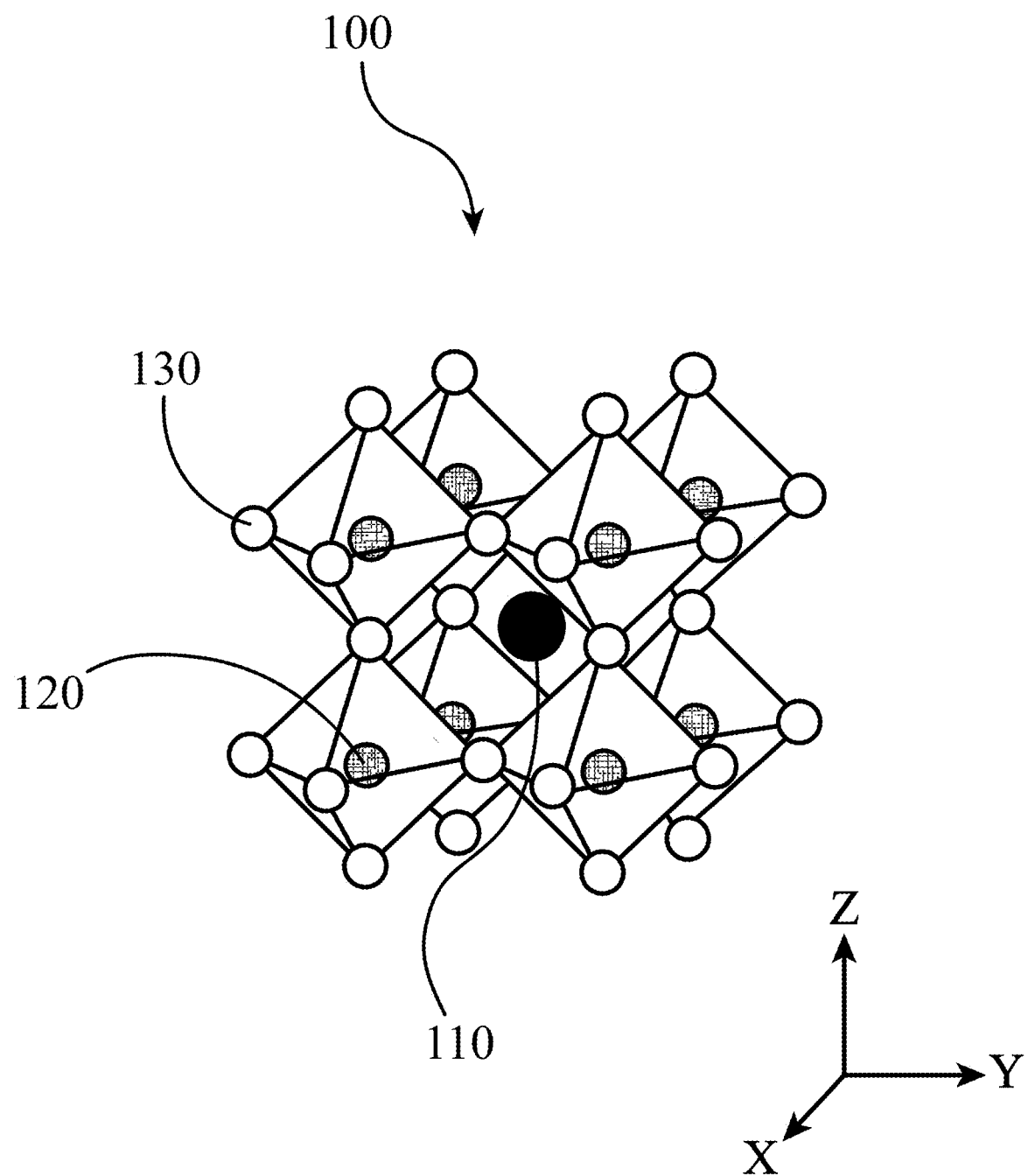
FIG. 1 illustrates a perovskite crystal having the general formula of ABX$_3$, according to some embodiments of the present disclosure.

100 . . . perovskite crystal
110 . . . A-cation
120 . . . B-cation
130 . . . X-anion
200 . . . method
210 . . . starting materials
220 . . . synthesizing
230 . . . starting perovskite crystals
240 . . . first treating
242 . . . starting solution components
244 . . . starting solution containing intermediate crystals
250 . . . second treating
252 . . . salt solution components
254 . . . salt solution containing final perovskite crystals

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure relates to perovskite crystals and method for making perovskite crystals. In some embodiments of the present disclosure, CsBr (AX) salt may be selectively extracted from CsPbBr$_3$ (ABX$_3$) perovskite crystals (e.g. nanocrystals (NC)) to yield PbBr$_2$ (BX$_2$) crystals. The PbBr$_2$ (BX$_2$) crystals may then be exposed to different salt solutions (e.g. glacial acetic acid) to yield a variety of emissive perovskite compounds with the generic structure A'$_2$A$_{n-1}$Pb$_n$Br$_{3n-1}$X'$_2$, where A=cesium (Cs$^+$), methylammonium (MA$^+$), formamidinium (FA$^+$); A'=A or H$^+$; X=Br$^-$, and X'=X or acetate (CH$_3$COO$^-$); and n is the number of BX$_2$ layers (see FIG. 1 below), where n=1, 2, 3, . . . ∞. In some examples, the ratios of PbBr$_2$:ABr:CH$_3$COOH may be systematically varied and show that certain ratios result in single-phase A'PbX'$_3$ perovskite crystals—an effective A-site cation exchange and X-site anion exchange, where A=Cs$^+$, A'=Cs$^+$ MA$^+$, or FA$^+$, and X=Br$^-$ and X'=Cl$^-$, Br$^-$, or I$^-$. In some embodiments of the present disclosure, the salt solution concentration may be increased relative to that of the PbBr$_2$ crystals, such that time-resolved photoluminescence (PL) spectroscopy shows the dynamic evolution of many blue-shifted emission peaks due to the formation of n=1, 2, 3, 4, & 5 two-dimensional 2D networks in which $CH_3COO^-$ (X') anions and $Br^-$ (X) anions compete for the c-axis anion sites in $A'_2A_{n-1}Pb_nBr_{3n-1}X'_2$ NCs (see FIG. 5). Further, it is shown herein that the degree of $CH_3COO^-$ (X') incorporation, and thus the thickness of the 2D network (as defined by the number of sheets of octahedra stacked on one another), and emission energy, may be controlled by kinetic factors. After a longer time (~3 hours), thermodynamic forces dictated by Le Chatelier's principle may tune the structure in $A'_2A_{n-1}Pb_nBr_{3n-1}X'_2$NCs from exclusively n=1 to n=∞.

FIG. 1 illustrates that perovskites crystals 100 may organize into cubic crystalline structures, as well as other crystalline structures such as tetragonal and orthorhombic, and may be described by the general formula $ABX_3$, where X (130) is an anion and A (110) and B (120) are cations, typically of different sizes (A typically larger than B). Referring to the generic structure described above, $A'_2A_{n-1}Pb_nBr_{3n-1}X'_2$, lead is an example of a B-cation 120 and bromine is an example of an anion X (130). Thus, the generic structure may also be represented by $A'_2A_{n-1}B_nX_{3n-1}X'_2$, where A' and A are different or the same A-cations 110, B is a B-cation 120, and X and X' are the same or different X anions 130, but where A' and X' represent ions that have been exchanged with the ions present in the starting perovskite material, $ABX_3$. Finally, n is the number of $BX_2$ layers within the structure between A'X' layers, which is also equal to the number of octahedral sheets stacked on one another. FIG. 1 illustrates that a perovskite 100 may also be visualized as a cubic unit cell, where the B-cation 120 resides at the eight corners of a cube, while the A-cation 110 is located at the center of the cube and with 12 X-anions 130 centrally located between B-cations 120 along each edge of the unit cell. Typical inorganic perovskites include calcium titanium oxide (calcium titanate) minerals such as, for example, $CaTiO_3$ and $SrTiO_3$. In some embodiments of the present disclosure, the A-cation 110 may include a nitrogen-containing organic compound such as an alkylammonium compound. The B-cation 120 may include a metal and the X-anion 130 may include a halogen.

Additional examples for the A-cation 110 include organic cations and/or inorganic cations. Organic A-cations 110 may be an alkylammonium cation, for example a $C_{1-20}$ alkylammonium cation, a $C_{1-6}$ alkylammonium cation, a $C_{2-6}$ alkylammonium cation, a $C_{1-5}$ alkylammonium cation, a $C_{1-4}$ alkylammonium cation, a $C_{1-3}$ alkylammonium cation, a $C_{1-2}$ alkylammonium cation, and/or a $C_1$ alkylammonium cation. Further examples of organic A-cations 110 include methylammonium ($CH_3NH_3^+$), ethylammonium ($CH_3CH_2NH_3^+$), propylammonium ($CH_3CH_2CH_2NH_3^+$), butylammonium ($CH_3CH_2CH_2CH_2NH_3^+$), formamidinium ($NH_2CH=NH_2^+$), and/or any other suitable nitrogen-containing organic compound. In other examples, an A-cation 110 may include an alkylamine. Thus, an A-cation 110 may include an organic component with one or more protonated amine groups. For example, an A-cation 110 may be an alkyl diamine such as formamidinium ($NH_2CH=NH_2^+$). Thus, the A-cation 110 may include an organic constituent in combination with a nitrogen constituent. In some cases, the organic constituent may be an alkyl group such as straight-chain or branched saturated hydrocarbon group having from 1 to 20 carbon atoms. In some embodiments, an alkyl group may have from 1 to 6 carbon atoms. Examples of alkyl groups include methyl ($C_1$), ethyl ($C_2$), n-propyl ($C_3$), 1-methyl-1-ethyl ($C_3$), n-butyl ($C_4$), 1-methyl-1-propyl ($C_4$), 2-methyl-1-propyl ($C_4$), 1,1-dimethyl-1-ethyl ($C_4$), n-pentyl ($C_5$), 1-methyl-1-butyl ($C_5$), 1-ethyl-1-propyl ($C_5$), 2-methyl-1-butyl ($C_5$), 3-methyl-1-butyl ($C_5$), 1,1-dimethyl-1-propyl ($C_5$), 2,2-dimethyl-1-propyl ($C_5$), and n-hexyl ($C_6$). Additional examples of alkyl groups include n-heptyl ($C_7$), n-octyl ($C_8$) and the like. In some embodiments, the organic constituent may be an alkyl group such as a straight-chain or branched unsaturated group having from 1 to 20 carbon atoms. Examples of unsaturated alkyl groups include ethenyl ($C_2$), 1-propenyl ($C_3$), 2-propenyl ($C_3$), 1-butenyl ($C_4$), 2-butenyl ($C_4$), 3-butenyl ($C_4$), 2-methyl-1-propenyl ($C_4$), 2-methyl-2-propenyl ($C_4$), 1-pentenyl ($C_5$), 2-pentenyl ($C_5$), 3-pentenyl ($C_5$), 4-pentenyl ($C_5$), 1-methyl-1-butenyl ($C_5$), 2-methyl-1-butenyl ($C_5$), 3-methyl-1-butenyl ($C_5$), 1,2-dimethyl-1-propenyl ($C_5$), 1,2-dimethyl-2-propenyl ($C_5$), and 1-hexenyl ($C_6$). Additional examples of alkyl groups include 1-heptenyl ($C_7$), 1-octenyl ($C_8$) and the like. In addition, the A-cation 110 may include an unsaturated species with a nitrogen constituent. In some cases, the nitrogen-containing organic group may be an aryl group having from 3 to 20 carbon atoms. Examples of aryl groups include pyridine ($C_5H_5N$), pyridazine (1,2-$C_4H_4N_2$), pyrimidine (1,3-$C_4H_4N_2$), pyrazine (1,4-$C_4H_4N_2$), triazine (1,2,3-1,2-$C_3H_3N_3$; 1,2,4-1,2-$C_3H_3N_3$; 1,3,5-1,2-$C_3H_3N_3$), bipyridine (2,2'-$C_{10}H_8N_2$; 2,3'-$C_{10}H_8N_2$; 2,4'-$C_{10}H_8N_2$; 3,3'-$C_{10}H_8N_2$; 3,4'-$C_{10}H_8N_2$; and 4,4'-$C_{10}H_8N_2$), phenanthroline (1,10-$C_{12}H_8N_2$ and other isomers), terpyridine (2,2';6',2''-$C_{15}H_{11}N_3$ and other isomers) and the like. In the cases where more than one nitrogen is present, the A-cation may be multivalent, i.e., di-cation, tri-cation, etc. by pronating the amine groups to form ammoniums. In addition, instead of protonation, covalent bonds can be formed to one or more amine nitrogen atoms to give ammoniums. For example, 4,4'-bipyridine can be doubly methylated to form N,N'-dimethyl-4,4'-bipyridinium $[(C_5H_4NCH_3)_2]^{2+}$, the dichloride salt of which is commonly known as paraquat. In these cases of multivalent cations, the stoichiometry of the $A'_2A_{n-1}Pb_nBr_{3n-1}X'_2$ structure changes since fewer A-cations are required for charge balance. In the di-cation paraquat example, only one A-cation is required to charge-balance two perovskite layers, generating a structure $A''A_{n-1}Pb_nBr_{3n-1}X'_2$ where $A''=[(C_5H_4NCH_3)_2]^{2+}$.

Examples of metal B-cations 120 include, for example, lead, tin, germanium, and or any other 2+ valence state metal that can charge-balance the perovskite crystal 100. Examples for X-anions 130 include halogens: e.g. fluorine, chlorine, bromine, and/or iodine. In some cases, the perovskite crystal 100 may include more than one type of X-anion 130, for example pairs of halogens; chlorine and iodine, bromine and iodine, and/or any other suitable pairing of halogens. In other cases, the perovskite crystal 100 may include two or more halogens of fluorine, chlorine, bromine, iodine, and/or astatine.

Thus, the A-cation 110, the B-cations 120, and X-anion 130 may be selected within the general formula of $ABX_3$ to produce a wide variety of perovskite crystals 100, including, for example, methylammonium lead triiodide ($CH_3NH_3PbI_3$), and mixed halide perovskites such as $CH_3NH_3PbI_{3-x}Cl_x$ and $CH_3NH_3PbI_{3-x}Br_x$. Thus, a perovskite crystal 100 may have more than one halogen element, where the various halogen elements are present in non-integer quantities; e.g. x is not equal to 1, 2, or 3. In addition, perovskite crystals may form three-dimensional (3D), two-dimensional (2D), one-dimensional (1D) or zero-dimensional (0D) networks, possessing the same unit structure ($BX_6^{4-}$ octahedra).

In a perovskite crystal 100, the negative charge of the metal halide octahedra (X-anions 130 in FIG. 1) may be balanced by monovalent A-cations 110, for example, by alkali metal and/or organic cations, as described above. Thus, FIG. 1 illustrates eight octahedra surrounding a single A-cation 110, where each octahedra shares six X-anions 130 positioned at the corners of the octahedra, with neighboring octahedra, and each grouping of six X-anions 130 surround a centrally positioned B-cation 120. Referring again to FIG. 1, the perovskite crystal 100 may be visualized as having a first sheet of four octahedra in the XY plane, positioned on a second sheet of four octahedra, also positioned in the XY plane. The size of the cations may influence the emission properties of the perovskite crystal 100 by changing the bonding, dimensionality, and/or tilt angle of the octahedra. Cations with ionic radii that satisfy the "tolerance factor" will form three-dimensional, isotropic crystals with the general crystal structure of $ABX_3$ as shown in FIG. 1, where the A-cation 110 may include cesium ($Cs^+$), methylammonium ($MA^+$), and/or formamidinium ($FA^+$). Larger A-cations may lead to layered compounds with blue-shifted emission due to two-dimensional network (2DN) quantum confinement.

It is demonstrated herein that $CsPbBr_3$ ($ABX_3$) perovskite nanocrystals may be utilized to produce A-cation-exchanged and X-anion exchanged $A'_2A_{n-1}B_nX_{3n-1}X'_2$ perovskite nanocrystals, as well as 2D layered perovskites within the original nanocrystal framework, for example where $A=Cs^+$ is exchanged with $A'=FA^+$, $MA^+$, $Cs^+$ and/or $H^+$. In some embodiments of the present disclosure, these transformations may be achieved by converting $CsPbBr_3$ ($ABX_3$) nanocrystals into $PbBr_2$ ($BX_2$) nanocrystals by extracting CsBr (AX) with a water-ethanol solution. Subsequently, ion pairs (A' X') may be reinserted into the $PbBr_2$ ($BX_2$) nanocrystals to yield an array of compounds with the generic structure of $A'_2A_{n-1}Pb_nBr_{3n-1}X'_2$, where $A=Cs^+$, $MA^+$, $FA^+$; $A'=A$ or $H^+$; $X=Br^-$; $X'=X^-$ or acetate ($CH_3COO^-$); and n is equal to the number of octahedral sheets and is proportional to the thickness of the exchanged nanocrystals, where n=1, 2, 3, . . . ∞. In some embodiments, depending on the conditions, perovskite nanocrystal solutions with similar size and emission properties to the parent $CsPbBr_3$ ($ABX_3$) nanocrystals were synthesized, showing that the salt extraction and reinsertion processes do not disrupt the original nanocrystal framework, e.g. the $PbBr_2$ ($BX_2$) nanocrystal framework. In some examples, compounds with blue-shifted emission were synthesized, where the blueshift may be due to the formation of two-dimensional quantum-confined sheets in which $CH_3COO^-$ (X') and $Br^-$ (X) anions compete for the c-axis anion sites in $A'_2A_{n-1}Pb_nBr_{3n-1}X'_2$ NCs. Without wishing to be bound by theory, the larger size of $X'=CH_3COO^-$ vs $X=Br^-$ may disrupt the 3-dimensional perovskite crystal lattice, resulting in 2D sheets. It is demonstrated herein, that the degree of $CH_3COO^-$ (X') incorporation, and thus the 2D layer thickness and emission energy, may be tuned using Le Chatelier's Principle from exclusively n=1 to n=∞ in the $A'_2A_{n-1}Pb_nBr_{3n-1}X'_2$ structure. This approach highlights both the benefits and challenges associated with the solution environment of perovskite nanocrystals and enables chemistries inaccessible in conventional synthetic strategies of nanostructured and bulk perovskites.

In some embodiments of the present disclosure, $CsPbBr_3$ ($ABX_3$) perovskite nanocrystals were synthesized using a hot injection technique. After the nanocrystals were purified to remove excess reactants and size-selected using centrifugation, the resultant solid starting perovskite nanocrystals ($ABX_3$) were treated to extract CsBr (AX) to yield intermediate nanocrystals, $PbBr_2$ ($BX_2$). Although centrifugation was used here, other physical means of separation may be used, including filtration and/or gravity settling. This was achieved by exploiting selective solubility of CsBr (AX) versus $PbBr_2$ ($BX_2$) in a starting solution of wet ethanol (EtOH), oleic acid, and oleylamine (CsBr is highly soluble in water and alcohols, whereas $PbBr_2$ is not). Other suitable solvents, in addition to or instead of water/ethanol, include ones with strong ability to dissolve the AX salt but not the $BX_2$ salt. This includes at least one of an alcohol, ether, a halogenated alkane, a halogenated benzene, a ketone, an alkylnitrile, and/or an ester. For example, a water/n-butanol or water/chlorobenzene mixture will work. Oleic acid and oleylamine are ligands that are used to either coordinate to the nanocrystal surface as ligands and/or induce other ligands to coordinate. Other suitable ligands include molecules with four or more carbons (e.g. branched and/or straight-chained saturated and/or unsaturated hydrocarbons) and a binding group. The binding group may include at least one of a hydroxyl group, an epoxide, an aldehyde, a ketone, a carboxylic acid, an acid anhydride, an ester, an amide, an acyl halide, an amine, a nitrile, an imine, an isocyanate, and/or a thiol. In some embodiments of the present disclosure, the binding group may be charged. For example, a ligand may include a negatively-charged oleate (e.g. deprotonated oleic acid). Another example of a charged binding group is ammonium containing compound (e.g. protonated amine) such as at least one of oleylammonium, phenylammonium, and/or dodecylammonium.

Figure 3:
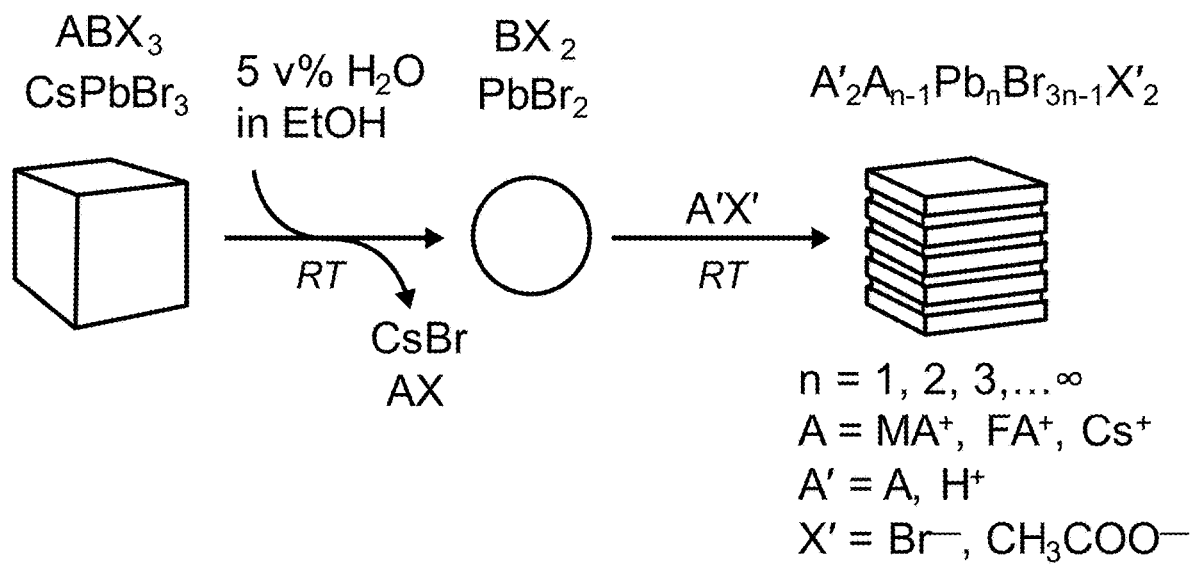
FIG. 3 illustrates transformations of perovskite crystals based on a first treating, resulting in the extraction of CsBr salt from a CsPbBr$_3$ (ABX$_3$) starting perovskite nanocrystals to form PbBr$_2$ (BX$_2$) intermediate nanocrystals that are subsequently converted into A'$_2$A$_{n-1}$Pb$_n$Br$_{3n-1}$X'$_2$ NCs via A'X' addition, according to some embodiments of the present disclosure.

The presence of oleylamine (8.3 vol %) and oleic acid (2.8 vol %) as well as water (5 vol %) in the hydrated ethanol solution help to maintain the $PbBr_2$ ($BX_2$) nanocrystals during the process. The $PbBr_2$ ($BX_2$) intermediate nanocrystals were then solvated in a nonpolar solvent such as hexane, toluene, or benzene. A solution of A'X'=CsBr in glacial acetic acid yielded a solution with A-cations as well as X-anions (Br—) and acetate ($X'=CH_3COO^-$) anions. This is shown in FIG. 3. Alternatives to acetic acid are formic acid, other carboxylic acids, or any solvent that does not dissolve the $PbBr_2$ ($BX_2$) nanocrystals but dissolves the A'X' salt such as toluene, halogenated arenes, ketones, nitriles, etc. Anions like acetate may also be directly added to the solution as a salt, A'X', where X'=acetate, formatethiocyanate, isocyanate, carbonate, chromate, phosphate, sulfate, sulfite, hydroxide, nitrate, nitrite, percholorite, etc.

In some embodiments of the present disclosure, a salt of formula $A'_2X''$ where X''=dianions such as terephthalate $[C_6H_4(COO^-)_2]$, derived from terephthalic acid $[C_6H_4(COOH)_2]$, may be used. These cases result in slight stoichiometry changes, compared to the examples described above, such that $A'_2A_{n-1}Pb_nBr_{3n-1}X''$ (versus $A'_2A_{n-1}Pb_nBr_{3n-1}X'_2$) where $X''=[C_6H_4(COO^-)_2]$ are formed. The salts may be used in combination to form a solution with many cations and anions. The salt solution modifies the $PbBr_2$ intermediate nanocrystals. Depending on the volume fractions of the $PbBr_2$ starting solution (0.1 to 0.4) and acetic acid salt solution (0.04 to 0.08), as described in detail below, the method yielded final perovskite nanocrystals have the general structure described above; $A'_2A_{n-1}Pb_nBr_{3n-1}X'_2$ nanocrystals with n=1, 2, 3, . . . ∞. In some embodiments of the present disclosure, volume fractions and ratios will change depending on the salt solution chosen for a particular application and/or final product. In other words, the volume fractions and/or ratios to yield n=1 and n=infinity may vary significantly depending on the components used (e.g. A, X', etc.) and other treating conditions and/or parameters (e.g. whether acetic acid or other solvents are used).

Figure 2:
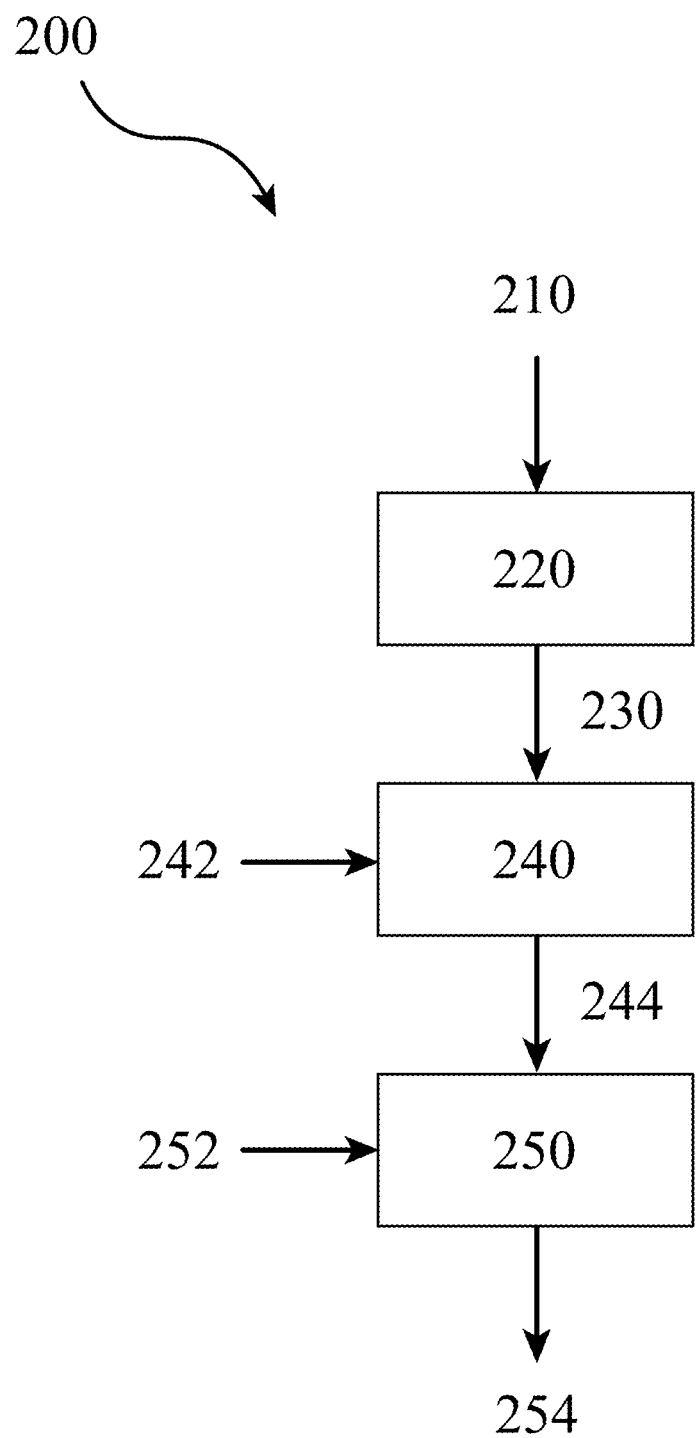
FIG. 2 illustrates a method for making a perovskite crystal, according to some embodiments of the present disclosure.

The method described above is summarized in FIG. 2. The method 200 may begin with the synthesizing 220 of starting perovskite crystals 230 having the structure $ABX_3$ (e.g. $CsPbBr_3$, $CsPbI_3$, $CsSnI_3$, $CsPbI_2Br$, $(CH_3NH_3)_{1-x}Cs_xPbI_{3-y}Cl_y$, $(CH_3NH_3)_{1-x}Cs_xPbI_{3-y}Cl_y$, $(NH_2CHNH_3)_{1-x}Cs_xPbI_3$, $(NH_2CHNH_3)_{1-x}Cs_xPb_ySn_{1-y}I_3$, and $(NH_2CHNH_3)_{1-x}Cs_xPb_ySn_{1-y}I_{3-z}Cl_z$) using the appropriate starting materials 210. The starting perovskite crystals 230 may be directed to a first treating 240, where the starting perovskite crystals 230 (e.g. $CsPbBr_3$) may be contacted with various starting solution components 242 in the first treating 240, resulting in the removal of at least a portion of the A-cation (e.g. $A=Cs^+$, $MA^+$, $FA^+$, or $H^+$) and/or X-anion (e.g. at least one halogen) to produce a starting solution 244 containing intermediate crystals (not shown), having a structure that includes $BX_2$ (e.g. $PbBr_2$, $SnI_2$, $PbCl_2$, $Sn_{1-x}Pb_xI_2$ (where $0 \geq x \geq 1$), $PbI_{2-y}Br_y$ (where $0 \geq y \geq 2$)). In some embodiments of the present disclosure, the starting solution components 242 may include a combination of solvents known to dissolve CsBr (AX) but not $PbBr_2$ ($BX_2$) in conjunction with ligands known to coordinate to nanocrystal surfaces, where the combination may result in the preferential removal of the A-cation from the starting $ABX_3$ perovskite crystals 230, resulting in the formation of the intermediate $BX_2$ crystals (not shown in FIG. 2) contained in the starting solution 244. The method 200 may proceed with a second treating 250 of the starting solution 244 by contacting the starting solution 244 containing the intermediate crystals with a salt solution 252 to produce a salt solution 254 containing final perovskite crystals (not shown in FIG. 2). In some embodiments of the present disclosure, the salt solution 252 may include on organic solvent (e.g. toluene, hexanes, chloroform), a carboxylic acid (e.g. acetic acid), and a salt A'X' [e.g. cesium bromide, methylammonium acetate, formamidinium formate, rubidium isocyanate, cesium thiocyanate, methylammonium carbonate, formamidinium chromate, etc.], resulting in the formation the salt solution 254 containing the final perovskite crystals (not shown in FIG. 2), where the final perovskite crystals have the general structure $A'_2A_{n-1}B_nX_{3n-1}X'_2$ with $n=1, 2, 3, \ldots \infty$. In some embodiments of the present disclosure, A' is different than A, or A' is the same as A. In some embodiments of the present disclosure, X' is different than X, or X' is the same as X.

Figure 4A:
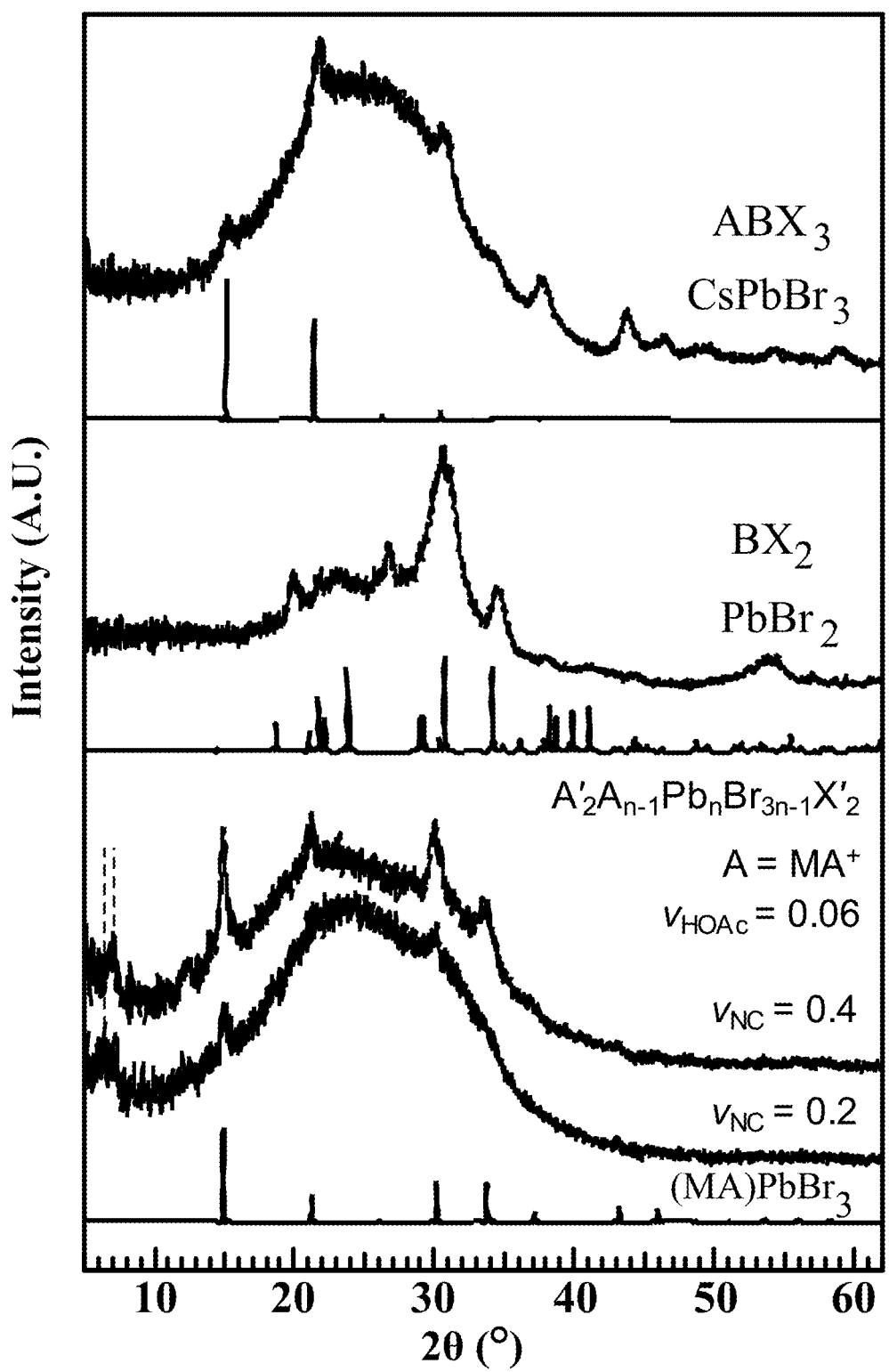
FIG. 4A illustrates structural analysis of perovskite nanocrystals (NCs) during a nanocrystal transformation process, according to some embodiment of the present disclosure, specifically XRD patterns of CsPbBr$_3$ (ABX$_3$), PbBr$_2$ (BX$_2$), and A'$_2$A$_{n-1}$Pb$_n$Br$_{3n-1}$X'$_2$ NCs synthesized with A'=MA$^+$, $v_{HOAc}$=0.06, and NC volume fractions of $v_{NC}$=0.4 and $v_{NC}$=0.2. Simulated powder diffraction patterns of the corresponding crystals are shown below each pattern. The broad scattering feature centered at 25° is due to amorphous organic ligand species and glass. Patterns are normalized and offset for clarity. Dashed vertical lines in the XRD patterns of the converted A'$_2$A$_{n-1}$Pb$_n$Br$_{3n-1}$X'$_2$NCs highlight peaks that cannot be attributed to (MA)PbBr$_3$.
Figure 4B:
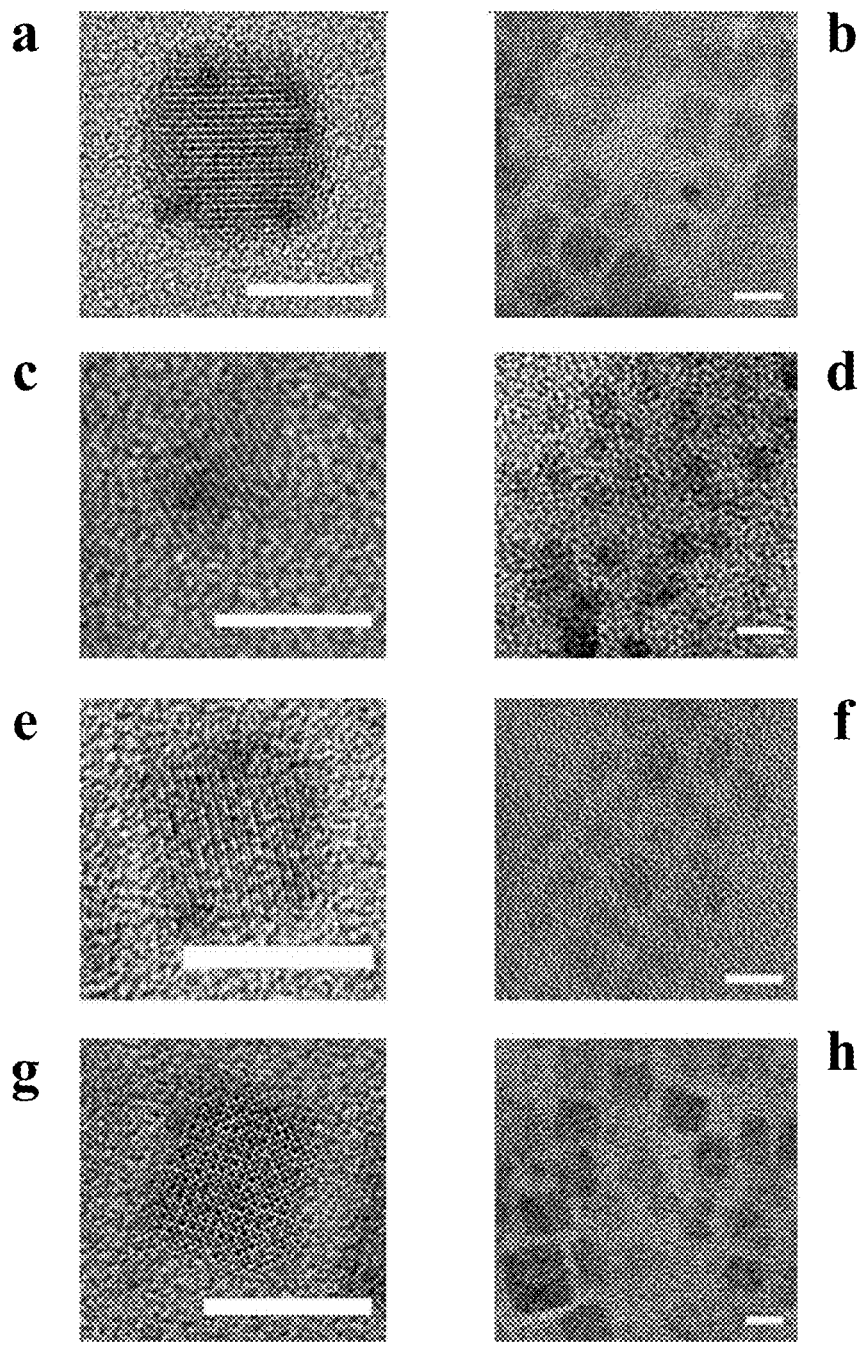
FIG. 4B illustrates structural analysis of perovskite nanocrystals during a nanocrystal transformation process, according to some embodiment of the present disclosure, specifically TEM images of: (Panel a) an individual CsPbBr$_3$ NC, and (Panel b) array of CsPbBr$_3$ NCs. (Panel c) TEM image of an individual PbBr$_2$ NC, and (Panel d) an array of PbBr$_2$NCs. (Panel e) TEM image of an individual A'$_2$A$_{n-1}$Pb$_n$Br$_{3n-1}$X'$_2$ NC, and (Panel f) an array of A'$_2$A$_{n-1}$Pb$_n$Br$_{3n-1}$X'$_2$ NCs synthesized with $v_{NC}$=0.4 (Panel g) TEM image of an individual A'$_2$A$_{n-1}$Pb$_n$Br$_{3n-1}$X'$_2$ NC, and (Panel h) an array of A'$_2$A$_{n-1}$Pb$_n$Br$_{3n-1}$X'$_2$ NCs synthesized with $v_{NC}$=0.2. Scale bars are 10 nm except (Panel c) and (Panel e), which are 5 nm.

The three types of perovskite nanocrystals described above are shown in FIG. 3: a starting perovskite nanocrystal $ABX_3$ ($CsPbBr_3$), an intermediate nanocrystal $BX_2$ ($PbBr_2$), and a final perovskite nanocrystal $A'_2A_{n-1}Pb_nBr_{3n-1}X'_2$ $Cs_2Cs_{n-1}Pb_nBr_{3n-1}CH_3COO_2$. FIG. 4A shows exemplary X-ray diffraction (XRD) patterns for examples of the three different perovskite nanocrystals depicted in FIG. 3. The XRD pattern of the starting $CsPbBr_3$ ($ABX_3$) perovskite nanocrystals exhibit the cubic (Pm3m) perovskite crystal phase, which is shown in the simulated pattern below the data. FIG. 4B illustrates transmission electron microscopy (TEM) images of an individual $CsPbBr_3$ NC ($ABX_3$) (Panel a) and an array of NCs (Panel b) shows the starting perovskite nanocrystals are faceted in shapes having characteristic lengths between about 6 nm and about 20 nm. Upon CsBr (AX) extraction by the first treating, the $PbBr_2$ ($BX_2$) intermediate nanocrystals exhibit the orthorhombic (Pmnb) crystal structure with broadened XRD peaks (see $PbBr_2$ ($BX_2$) spectrum in FIG. 4A), consistent with Scherrer broadening due to the significant reduction in crystallite volume associated with the loss of CsBr (AX). The reduction in crystallite size upon salt extraction is confirmed by the TEM images shown in (Panels b and c) of FIG. 4B, where the $PbBr_2$ ($BX_2$) intermediate nanocrystals are spherical with a diameter between about 5 nm and about 10 nm.

In this example, the structure of the final perovskite nanocrystals, $A'_2A_{n-1}Pb_{n-1}Br_{3n-1}X'_2$, was controlled by changing the volume fractions of the $PbBr_2$ ($BX_2$) intermediate nanocrystals in the organic solvent, e.g. toluene ($v_{NC}$), and acetic acid ($v_{HOAc}$). A salt solution of (MA)Br (A'=$MA^+$, X'=X=$Br^-$) was used with $v_{HOAc}$=0.06 as the example. Upon conversion of the $PbBr_2$ ($BX_2$) intermediate nanocrystals using $v_{NC}$=0.4 and $v_{HOAc}$=0.2, XRD peaks consistent with the formation of (MA)$PbBr_3$ (A'$BX'_3$) with cubic (Pnma) crystal structure were clearly observed (see FIG. 4A). The peak broadness in the final perovskite nanocrystals is similar to that of the starting $CsPbBr_3$ perovskite nanocrystals, and the characteristic (MA)$PbBr_3$ (A'$BX'_3$) (110) peak at $2\theta=14.9°$ of final perovskite nanocrystals is slightly shifted from the $2\theta=15.1°$ location for the parent $CsPbBr_3$ ($ABX_3$). These observations confirm $MA^+\alpha$(A') incorporation has occurred and suggest a similar nanocrystal size between the starting perovskite nanocrystals and the converted final perovskite nanocrystals. Low-angle reflections in the final perovskite nanocrystals also appear at $2\theta=7.1°$ for $v_{NC}$=0.4—corresponding to a spacing of 6.2 Å—and at $2\theta=6.5°$ for $v_{NC}$=0.2—corresponding to a spacing of 6.8 Å—that are absent from the starting $CsPbBr_3$ ($ABX_3$) perovskite nanocrystals and are not expected for (MA)$PbBr_3$ (A'$BX'_3$) nanocrystals with conventional surfactant ligands.

The large spacings of 6.2 and 6.5 Å that give rise to these low-angle reflections is inconsistent with a 3D (MA)$PbBr_3$ (A'$BX'_3$) structure and indicates a 2D material structure where the $\geq 6.2$ Å spacing reflects the distance between layered, stacked perovskite sheets. Similar low angle XRD reflections are characteristic of related 2D perovskite materials, for example $(C_6H_5C_2H_4NH_3)_2PbBr_4$ (phenylethylammonium), $(C_4H_9NH_3)_2(MA)_{n-1}Pb_nI_{3n+1}$ (butylammonium), and $Cs_2[C(NH_2)_3]Pb_2Br_7$. Without wishing to be bound by theory, formation of low-dimensional perovskite networks may be achieved by slicing the 3-dimensional $ABX_3$ perovskite crystal along specific lattice planes. Slicing along the (001) plane may result in the 2D structure type $A'_2A_{n-1}B_nX_{3n+1}$, ($X=Cl^-$, $Br^-$, $I^-$) where n corresponds to the number of $BX_2$ layers in the structure. Thus, n=1 for $(C_6H_5C_2H_4NH_3)_2PbBr_4$ and n=2 for $Cs_2[C(NH_2)_3]Pb_2Br_7$ in the above examples.

Figure 5A:
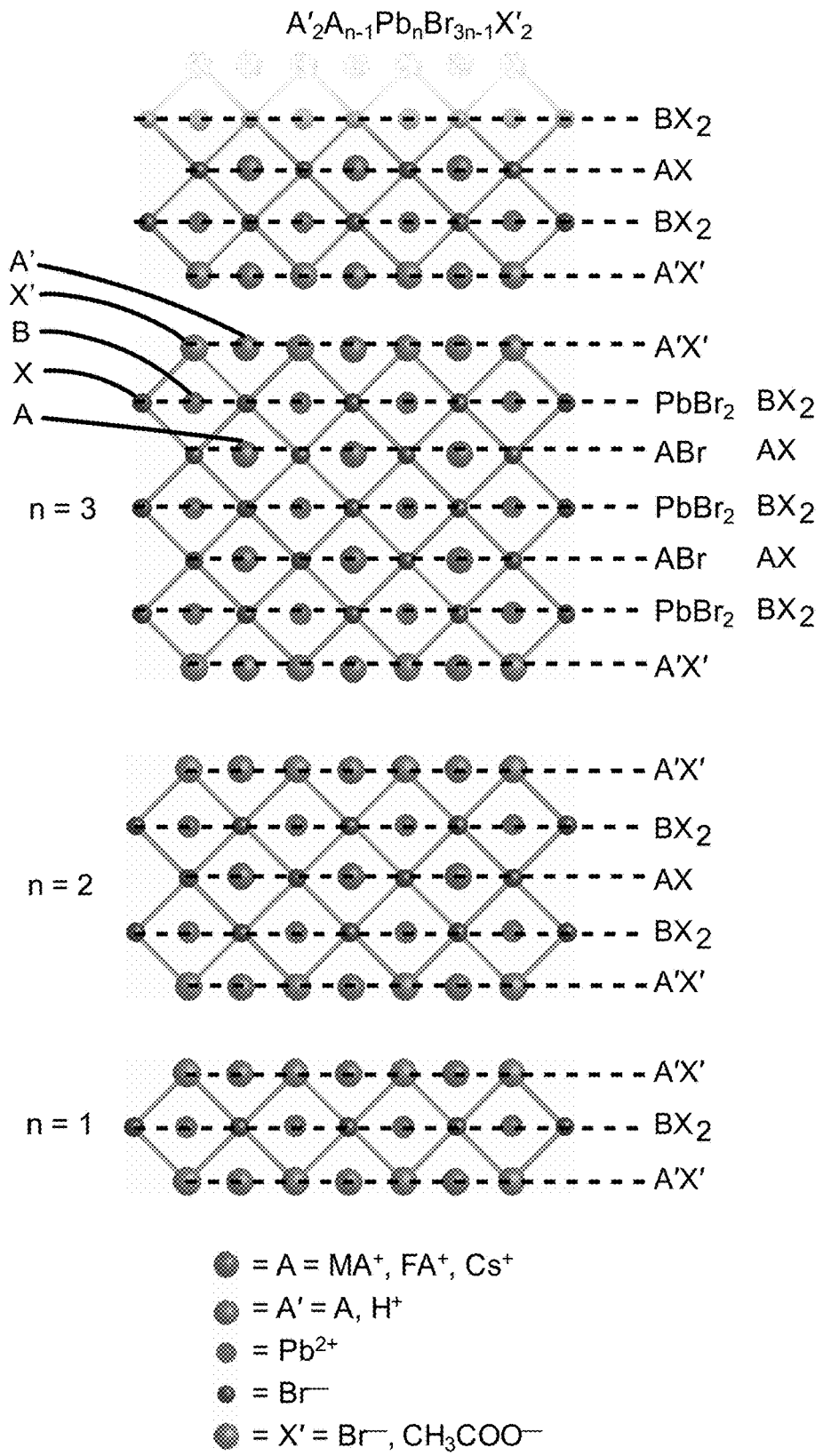
FIG. 5A illustrates a schematic of a layered A'$_2$A$_{n-1}$Pb$_n$Br$_{3n-1}$X'$_2$ compound, according to some embodiments of the present disclosure.

As describe herein, CsBr (AX) salt extraction from the starting $CsPbBr_3$ ($ABX_3$) perovskite nanocrystals by a first treating and reaction of the resulting intermediate $PbBr_2$ ($BX_2$) nanocrystals by a second treating gives final perovskite nanocrystals that are of comparable shape and dimension to the starting $CsPbBr_3$ ($ABX_3$) perovskite nanocrystals (see TEM images in (Panels a-h) of FIG. 4B). These data suggest that complete disruption of the $PbBr_2$ ($BX_2$) intermediate nanocrystals into discrete, isolated 2D perovskite sheets is unlikely since a broad size distribution of the converted nanocrystals would be expected. Therefore, it is proposed herein that the A'X' salt used in the second treating ($A=Cs^+$; A'=A, $MA^+$, $FA^+$; $X=Br^-$; X'=X, $CH_3COO^-$) transforms the intermediate $PbBr_2$ ($BX_2$) nanocrystal into a $A'_2A_{n-1}Pb_nBr_{3n-1}X'_2$ (or more generally into $A'_2A_{n-1}B_nX_{3n-1}X'_2$) layered final 2D perovskite nanocrystal network as shown in FIG. 5A. In this complex structure, the starting bromides from the intermediate $PbBr_2$ ($BX_2$) nanocrystals are bridging along the a- and b-axes ($Pb^{2+}$, $Br^-$ in FIG. 5A), whereas the new X' anion is located along the c-axis and terminates the 2D sheets. Without wishing to be bound by theory, it is posited that the acetate—from the glacial acetic acid solution, which is in large excess relative to the 0.01 M CsBr (AX) salt—may be the kinetically preferred initial X' anion that infiltrates along a single (001) plane of the intermediate $PbBr_2$ ($BX_2$) nanocrystals to form $A'_2A_{n-1}Pb_nBr_{3n-1}X'_2$ layered final perovskite nanocrystals. Similarly, it is also possible that the initial interlayer A' cations are $H^+$, which is why those are distinguished from the intralayer A cation ($Cs^+$, $MA^+$, $FA^+$) in FIG. 5A. Finally, it is worth noting that another potential complicating factor in our structure is that the charge-balancing ligands on the surface of the nanocrystals may be different than those of the A' or X' interlayers. For example, in FIG. 5A the interlayer groups are shown as A'=A or $H^+$, whereas oleylammonium groups that provide colloidal stability may be present at the nanocrystal surface. Likewise, interlayer anions $X'=Br^-$ or $CH_3COO^-$ may be substituted for oleate at the nanocrystal surface.

Referring again to FIG. 5A, it illustrates a layered 2D perovskite nanocrystal network made according to some embodiments described herein. The methods described herein may result in a final perovskite nanocrystal network constructed of two or more 2D sheets, where each sheet is composed of a combination of $BX_2$ layers and AX layers positioned between two layers of A'X'. Referring to FIG. 5A, for example, a final 2D perovskite network may be constructed of one or more first sheets where each sheet contains a single $BX_2$ layer positioned between two layers of A'X', resulting in one or more sheets having the overall stoichiometry of $A'_2BX_2X'_2$ (n=1). This same 2D perovskite network may also contain one or more sheets where each sheet contains two $BX_2$ layers and an AX layer positioned between the $BX_2$ layers, with the $BX_2$ layers and the AX layer positioned between two A'X' layers, resulting in one or more sheets having the overall stoichiometry of $A'_2AB_2X_5X'_2$ (n=2). This same 2D perovskite network may also contain one or more first sheets where each contains three $BX_2$ layers and two $BX_2$ layers, with all of these positioned between two A'X' layers, resulting in one or more sheets having the overall stoichiometry of $A'_2A_2B_3X_8X'_2$ (n=2).

Referring again to FIG. 5A, in general, the sheets of a 2D perovskite nanocrystal network, according to some embodiments of the present disclosure, may be defined by $A'_2A_{n-1}B_nX_{3n-1}X'_2$, where A' is a first cation, B is a second cation, A is a third cation, X is first anion, X' is a second cation, n is the number of $BX_2$ layers contained in the perovskite sheet, (n−1) is the number of AX layers positioned between $BX_2$ layers, and the number of A'X' layers is two. According to some embodiments of the present disclosure, n may be between greater than zero and 10, between greater than zero and 100, between greater than zero and 1,000, or between greater than zero and 10,000. In some embodiments of the present disclosure, n may be larger than 10,000. Further, these sheets may associate with other sheets to form 2D perovskite networks. Thus, the A'X' of a may be physically associated with the A'X' layers of adjacent sheets, forming A'X' interlayers between neighboring sheets of the perovskite network. The physical association may be by at least one of ionic bonds, van der Waals forces, dipole moments, and/or hydrogen bonds.

Figure 5B:
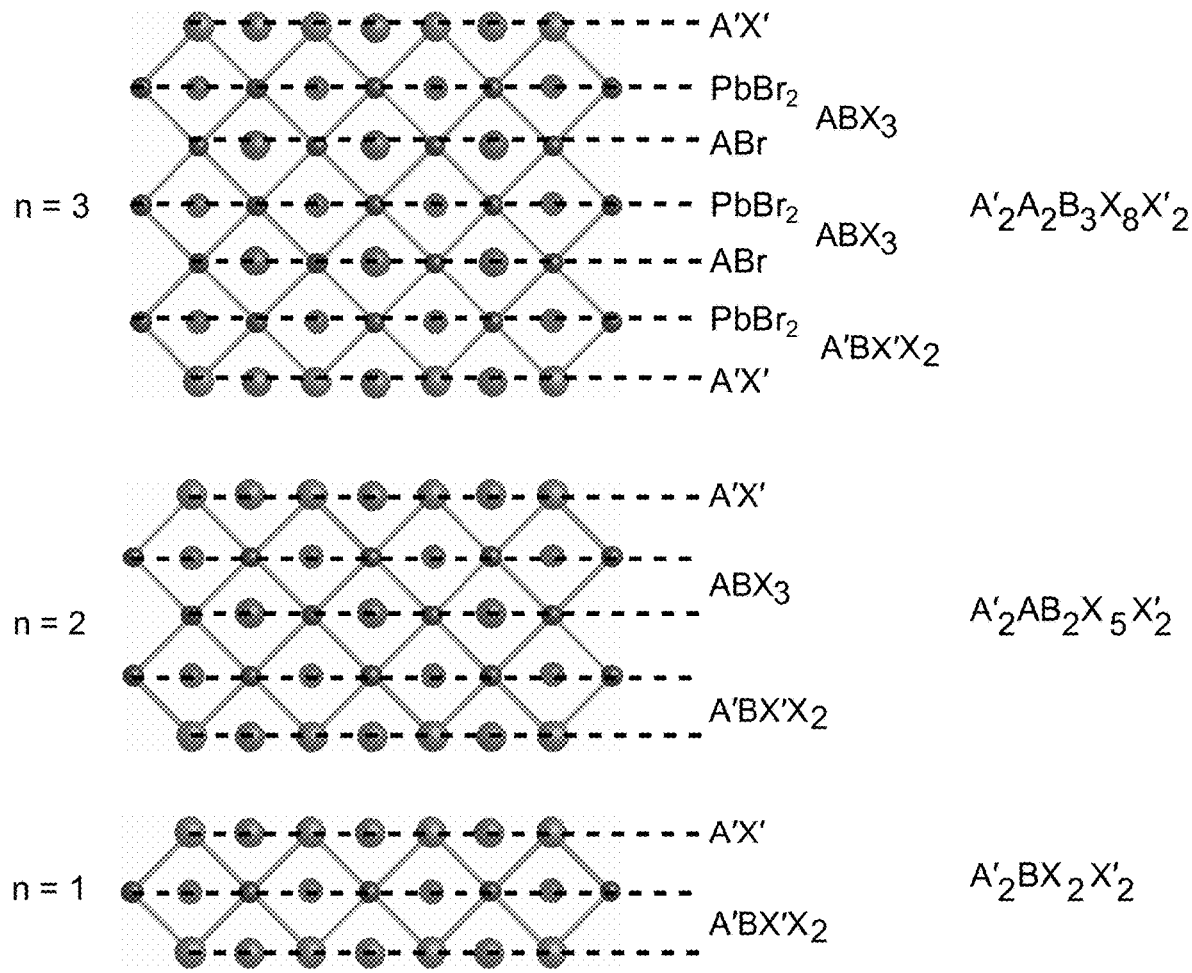
FIG. 5B illustrates a modified schematic of the one shown in FIG. 5A, of a layered A'$_2$A$_{n-1}$Pb$_n$Br$_{3n-1}$X'$_2$ compound, according to some embodiments of the present disclosure.

FIG. 5B illustrates a layered 2D perovskite nanocrystal network made according to some embodiments described herein, as shown in FIG. 5A, but with the perovskite stoichiometry shown in an alternate way. The methods described herein may result in a final perovskite nanocrystal network constructed of two or more 2D sheets, where each sheet is composed of a combination of octahedral layers of at least one of $A'BX'X_2$ and/or $ABX_3$ and an additional layer of A'X'. Referring to FIG. 5B, for example, a final 2D perovskite network may be constructed of one or more first sheets where each sheet contains a single octahedral layer of $A'BX'X_2$ and a neighboring layer of A'X', resulting in one or more sheets having the overall stoichiometry of $A'_2BX_2X'_2$ (n=1). This same 2D perovskite network may also contain one or more sheets where each sheet contains an octahedral layer of $A'BX'X_2$, an octahedral layer of $ABX_3$, and a layer of A'X', resulting in one or more sheets having the overall stoichiometry of $A'_2AB_2X_5X'_2$ (n=2). This same 2D perovskite network may also contain one or more first sheets where each has a single layer of an octahedral layer of $A'BX'X_2$, two layers octahedral layers of $ABX_3$, and a layer of A'X', resulting in one or more sheets having the overall stoichiometry of $A'_2A_2B_3X_8X'_2$ (n=3).

Referring again to FIG. 5B, in general, the sheets of a 2D perovskite nanocrystal network, according to some embodiments of the present disclosure, may be defined by $A'_2A_{n-1}B_nX_{3n-1}X'_2$, where A' is a first cation, B is a second cation, A is a third cation, X is first anion, X' is a second cation, n is the total number of octahedral layers ($ABX_3$ and $A'BX'X_2$), the number of $A'BX'X_2$ layers is one, and the number A'X' layers is one. In some embodiments of the present disclosure, n may be between greater than zero and 10, between greater than zero and 100, between greater than zero and 1,000, or between greater than zero and 10,000. In some embodiments of the present disclosure, n may be larger than 10,000. Further, these sheets may associate with other sheets to form 2D perovskite networks. Thus, the A'X' of a may be physically associated with the A'X' layers of adjacent sheets, forming A'X' interlayers between neighboring sheets of the perovskite network. The physical association may be by at least one of ionic bonds, van der Waals forces, dipole moments, and/or hydrogen bonds.

Figure 6:
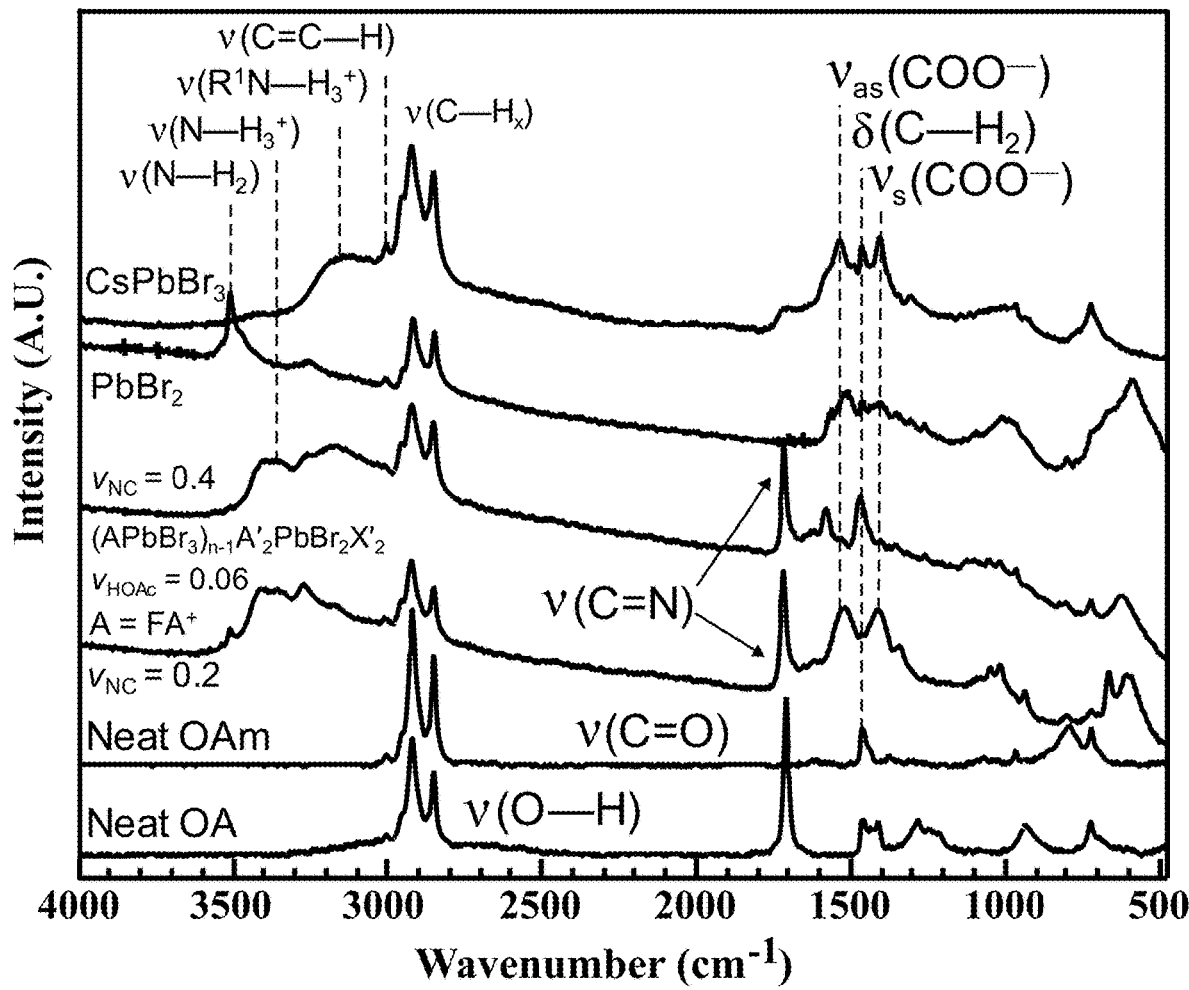
FIG. 6 illustrates FTIR data corresponding to the conversion of nanocrystals, according to some embodiments of the present disclosure. FTIR spectra of starting perovskite nanocrystals CsPbBr$_3$ (ABX$_3$), intermediate nanocrystals PbBr$_2$ (BX$_2$), and final perovskite nanocrystals A'$_2$A$_{n-1}$Pb$_n$Br$_{3n-1}$X'$_2$ NCs synthesized with A'=FA$^+$ (formamidinium), $v_{HOAc}$=0.06, and NC volume fractions of $v_{NC}$=0.4 and $v_{NC}$=0.2. Spectra of neat OAm and OA are provided for reference. R$^1$=oleyl. Spectra are normalized to the most intense peak and offset vertically for clarity.

Fourier transform infrared (FTIR) spectroscopy was used to elucidate additional insight into the chemical conversion of $PbBr_2$ ($BX_2$) to $A'_2A_{n-1}Pb_nBr_{3n-1}X'_2$ layered nanocrystals. The top spectrum in FIG. 6 is of the starting $CsPbBr_3$ ($ABX_3$) perovskite nanocrystals, which may be dominated by resonances of the surface ligands. The alkyl chains of the ligands are clearly seen with the hydrocarbon stretching, $\nu(C-H_x)=2925$ cm$^{-1}$, and methylene deformation modes at $\delta(C-H_2)=1464$ cm$^{-1}$. Vinylic proton resonances are also clearly observed at $\nu(C=C-H)=3007$ cm$^{-1}$. The nature of ligand binding to the nanocrystal surface are also visible in the FTIR spectra. The peak centered at $\nu(R^1N-H_3^+)=3132$ cm$^{-1}$ is due to stretching modes from oleylammonium, showing that the ligands may be cationically charged to balance the negative surface termination of the lead halide octahedra or oleate ligands in the parent $CsPbBr_3$ ($ABX_3$) NCs. Oleylamine (OAm) is provided for reference in FIG. 6. Excess oleic acid (OA) may be present in excess of the $CsPbBr_3$ starting perovskite nanocrystal solutions to drive oleate onto the NC surface. Excess OA is observed in the $CsPbBr_3$ ($ABX_3$) starting perovskite nanocrystal spectrum (which drives oleate onto the nanocrystal surface that engenders colloidal stability), as evidenced by the broad baseline from hydroxyl stretching spanning $\nu(O-H)=2400-3400$ cm$^{-1}$ and the carbonyl at $\nu(C=O)=1707$ cm$^{-1}$ of the carboxylic acid group. In addition, oleyl carboxylate (oleate) ligands are easily identified by the absence of the broad hydroxyl peak and new peaks characteristic of carboxylate, which are the symmetric, $\nu_s(COO^-)=1407$ cm$^{-1}$, and asymmetric, $\nu_{as}(COO^-)=1538$ cm$^{-1}$, stretching modes. Neat OA is included for reference in FIG. 6.

Referring again to FIG. 6, upon extraction of CsBr (AX) by the first treating, the FTIR spectrum of the resulting $PbBr_2$ ($BX_2$) intermediate nanocrystals show significantly different surface chemistry. A new resonance at $\nu(N-H_2)=3511$ cm$^{-1}$ suggests OAm binds to a Pb (B) surface atoms as a neutral L-type ligand. The PbBr$_2$ also are free from excess OA based on the absence of $\nu(C=O)=1707$ cm$^{-1}$ of the carboxylic acid group. A small feature at ~3250 cm$^{-1}$ could be due to the $\nu(R^1N-H_3^+)$ stretch from a charge-balanced oleylammonium-oleate salt complex, which could also be the source of the minor features near 1407 and 1538 cm$^{-1}$ from oleate $\nu(COO^-)$ symmetric and asymmetric stretching modes, respectively.

For conversion studies, FA$^+$-based solutions were probed since FA$^+$ (A') has a characteristic resonance at $\nu(C=N)=1718$ cm$^{-1}$ that is convenient for monitoring this cationic species. Incorporation of FA$^+$ (A') upon reaction with PbBr$_2$ (BX$_2$) intermediate nanocrystals is clearly observed in FIG. 6 for final perovskite nanocrystals with both $v_{NC}=0.4$ and $v_{NC}=0.2$. A new ammonium stretching peak is observed at $\nu(N-H_3^+)=3276$ cm$^{-1}$ in addition to the $\nu(C=N)$ resonance that further confirms FA$^+$ (A') incorporation. It is proposed herein that acetate is incorporated into the final perovskite nanocrystal structure A'$_2$A$_{n-1}$Pb$_n$Br$_{3n-1}$X'$_2$ following conversion of the PbBr$_2$ (BX$_2$) intermediate nanocrystals based on these FTIR spectra: nanocrystals converted with $v_{NC}=0.4$ show two small peaks due to the symmetric and asymmetric carboxylate peaks appearing at $v_s(COO^-)=1413$ cm$^{-1}$ and $v_{as}(COO^-)=1526$ cm$^{-1}$, respectively. Notably, the energies of these peaks provide strong evidence that acetate binds to Pb(II) in a bidentate fashion by comparison to the coordination mode of metal acetate complexes, providing additional evidence that the X'=CH$_3$COO$^-$ c-axis ligands terminate (rather than bridge) haloplumbate(II) layers. When $v_{NC}=0.2$, these new peaks associated with acetate greatly increase in intensity relative to the $\nu(C=N)$ mode, indicating increased acetate incorporation into the A'$_2$A$_{n-1}$Pb$_n$Br$_{3n-1}$X'$_2$ NC relative to that from $v_{NC}=0.4$. This observation is consistent with the slight shift toward lower angle (larger lattice spacing suggesting greater acetate content) for the low angle XRD peak from $v_{NC}=0.4$ versus that from $v_{NC}=0.2$ (see FIG. 4A).

Figure 7A:
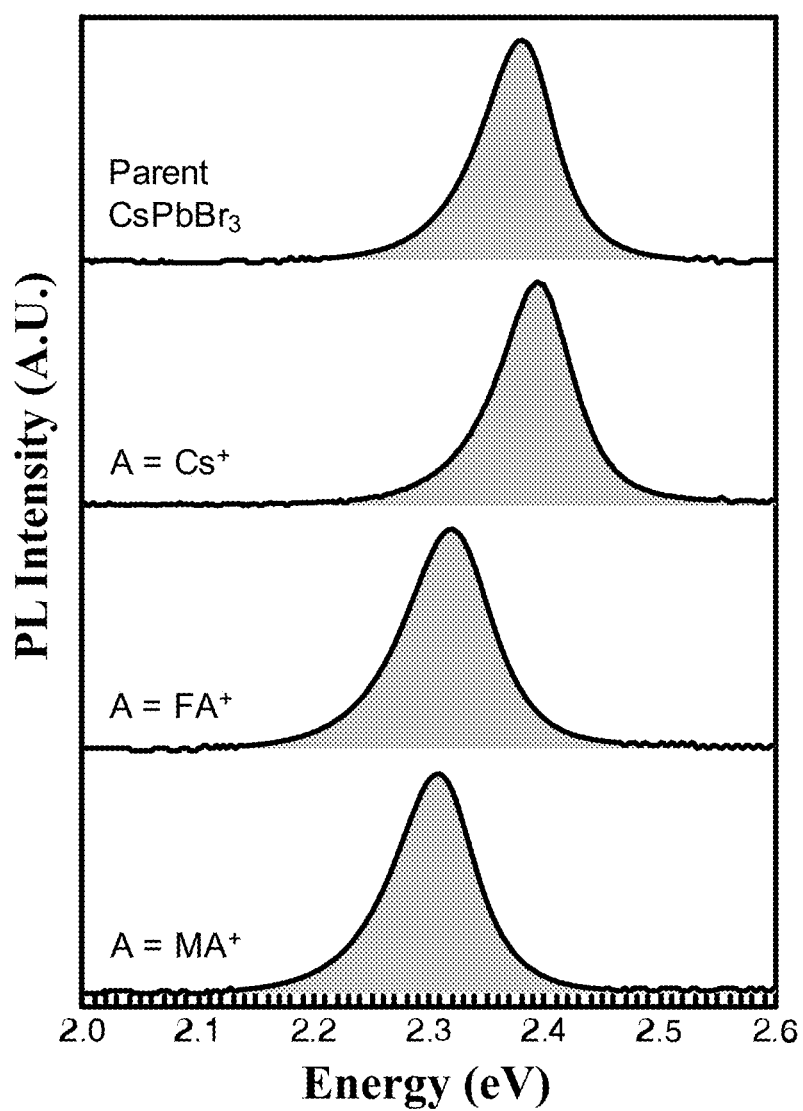
FIG. 7A illustrates photoluminescence of A'$_2$A$_{n-1}$Pb$_n$Br$_{3n-1}$X'$_2$ final perovskite nanocrystals, according to some embodiments of the present disclosure, specifically PL spectra of the starting CsPbBr$_3$ perovskite nanocrystals and A'$_2$A$_{n-1}$Pb$_n$Br$_{3n-1}$X'$_2$ final perovskite nanocrystals for the three different cations investigated in this study (A'=Cs$^+$, FA$^+$, and MA$^+$). $v_{NC}$=0.4 and $v_{HOAc}$=0.06 for each spectrum. Spectra are normalized and offset for clarity.
Figure 7B:
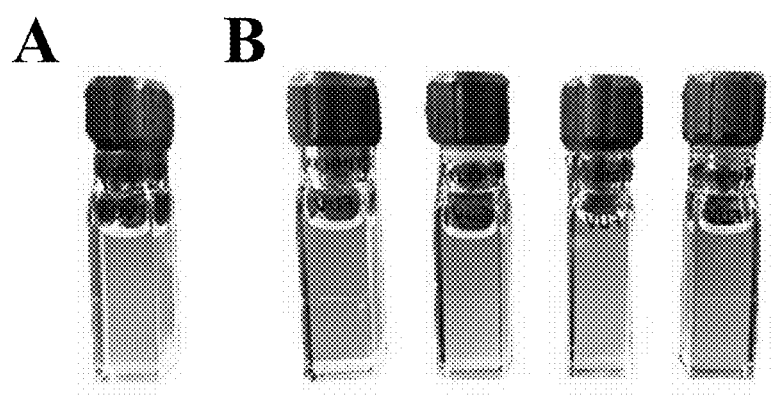
FIG. 7B illustrates a photograph of the starting solution of CsPbBr$_3$ perovskite nanocrystals (Panel A) and solutions of the A'$_2$A$_{n-1}$Pb$_n$Br$_{3n-1}$X'$_2$ final perovskite nanocrystals (A=MA$^+$) with n decreasing from left to right (Panel B).

Provided herein is a detailed account of the emission properties of these nanocrystals during the salt exchange process (e.g. second treating). The photoluminescence (PL) peak from the starting CsPbBr$_3$ (ABX$_3$) perovskite nanocrystals exhibits a full-width at half maximum (FWHM) value of 82 meV at an emission energy of 2.4 eV. Following CsBr (AX) extraction and addition of A'X' solution ($v_{NC}=0.4$), we observe A'$_2$A$_{n-1}$Pb$_n$Br$_{3n-1}$X'$_2$ final perovskite nanocrystal solutions (A'=Cs$^+$, MA$^+$, FA$^+$) with emission energies near that of the starting CsPbBr$_3$ (ABX$_3$) perovskite nanocrystals (2.39 eV for A=Cs$^+$; 2.32 eV for A=FA$^+$; 2.35 eV for A=MA$^+$) with FWHM values remaining at 82 meV in all cases. These data show that the overall cation exchange process retains the size and size distribution of the starting CsPbBr$_3$ (ABX$_3$) perovskite nanocrystals and provides additional evidence that the PbBr$_2$ (BX$_2$) intermediate nanocrystals are derived directly from salt extraction from the starting perovskite nanocrystals without loss or gain of Pb' cations. This also suggests that isolated 2DN sheets are not formed upon salt solution addition, with acetate simply binding to and separating some of the haloplumbate(II) layers and/or terminating the surface of A'$_2$A$_{n-1}$Pb$_n$Br$_{3n-1}$X'$_2$ NCs. Photographs of UV-illuminated solutions of the starting CsPbBr$_3$ (ABX$_3$) nanocrystals (see Panel A of FIG. 7B) and A'$_2$A$_{n-1}$Pb$_n$Br$_{3n-1}$X'$_2$ final perovskite nanocrystals with conditions that yield similar emission (leftmost cuvette, n=Panel B of FIG. 7B) and blue-shifted emission resulting from 2D layers within the nanocrystals (right 3 cuvettes, of Panel B of FIG. 7B). The required volume fraction for complete conversion to a homogeneous A'$_2$A$_{n-1}$Pb$_n$Br$_{3n-1}$X'$_2$ final perovskite nanocrystal product may be monitored by simply titrating 0.01 M CsBr (AX) salt solutions into each PbBr$_2$ (BX$_2$) intermediate nanocrystal solution.

Figure 7C:
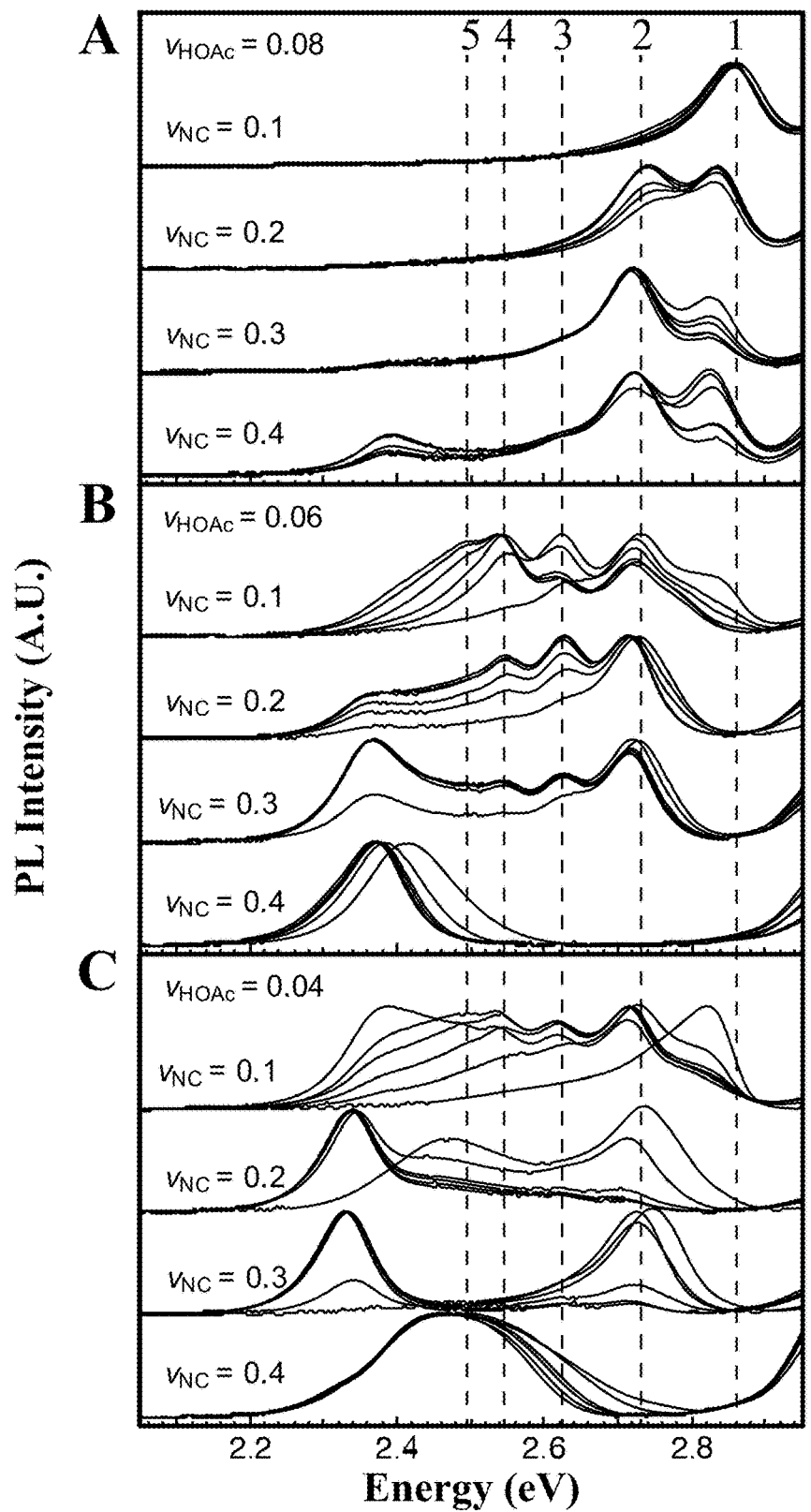
FIG. 7C illustrates time-resolved PL of A'$_2$A$_{n-1}$Pb$_n$Br$_{3n-1}$X'$_2$ NCs (A'=MA$^+$) at varying $v_{NC}$ values for (Panel A) $v_{HOAc}$=0.08, (Panel B) $v_{HOAc}$=0.06, and (Panel C) $v_{HOAc}$=0.04. Each set of time-evolution spectra are normalized in intensity and offset vertically for clarity. The light-colored spectrum in each set is the initial spectrum, and the darkest color is the final spectrum. The spectra are taken from t=0 to t=180 min in 30-min intervals. Gray dashed vertical lines indicate n values.
Figure 8:
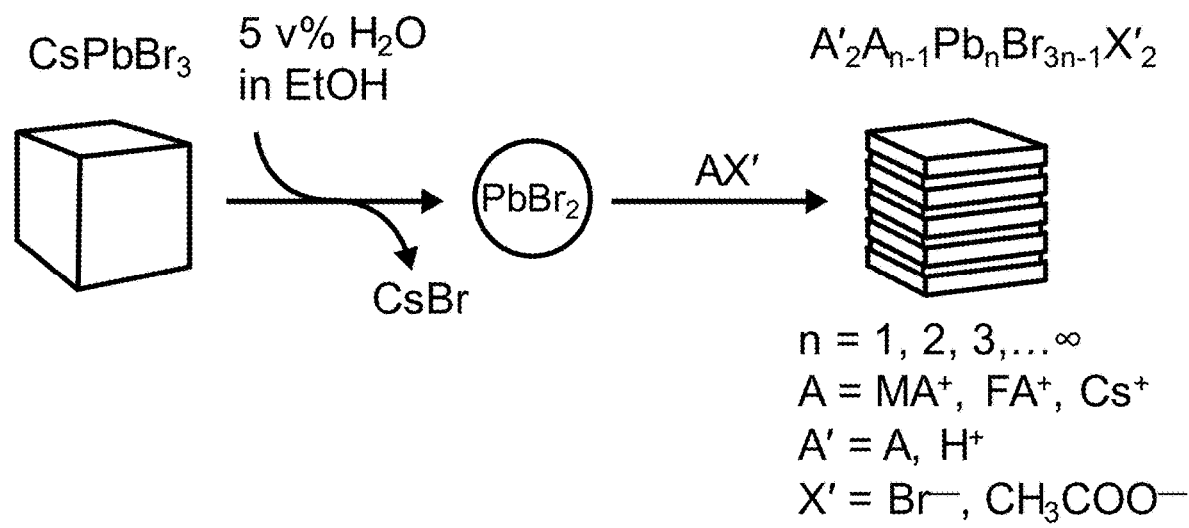
FIG. 8 provides a comparison of transformations of perovskite crystals based on a first treating, resulting in the extraction of CsBr salt from a CsPbBr$_3$ starting perovskite nanocrystals to form PbBr$_2$ intermediate nanocrystals that are re-formed into A'$_2$A$_{n-1}$Pb$_n$Br$_{3n-1}$X'$_2$ NCs via AX' addition, to a photograph of the corresponding NC solutions, according to some embodiments of the present disclosure, as explained for FIG. 7B.
Figure 8:
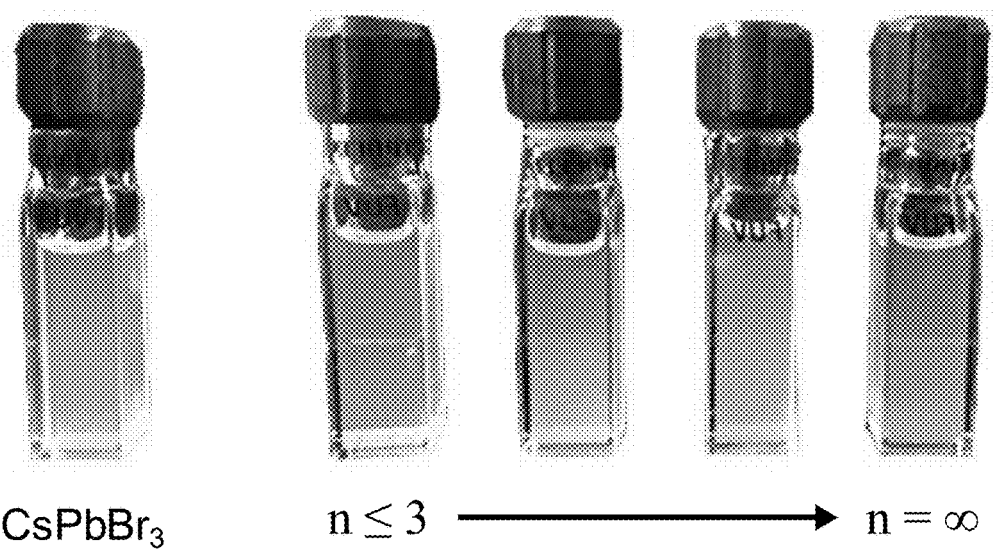

Because both the perovskite nanocrystals and ligand concentrations can influence the structure of perovskite NCs in solution, a series of conversion experiments (e.g. second treating steps) were performed using (MA)Br (A'X') salt solutions in which the total reaction solution volume, ligand concentration, and salt concentration were held constant, and $v_{NC}$ and $v_{HOAc}$ are varied. Panel A of FIG. 7C shows high acetic acid conditions ($v_{HOAc}=0.08$). At $v_{NC}=0.1$, a single emission peak at 2.85 eV is observed, which does not appreciably evolve over the course of 3 hours. When the volume fraction of perovskite nanocrystals was increased from $v_{NC}=0.2$-$0.4$, a variety of PL peaks were observed, and the peaks evolved with time. Time-resolved spectra taken at t=0 and every 30 minutes following salt solution addition revealed it took ~3 hours to reach an equilibrium perovskite nanocrystal composition at ambient temperature. Several interesting features are observed upon close inspection of the time-resolved PL spectra. Immediately after the (MA)Br solution was added to the PbBr$_2$ intermediate nanocrystal solution, for all $v_{NC}>0.1$, additional peaks emerged at lower energies. The same trend was observed at lower volume fractions of acetic acid, $v_{HOAc}=0.06$ (Panel B of FIG. 7C) and $v_{HOAc}=0.04$ (Panel C of FIG. 7C). Under these lower acetic acid concentration conditions, even more complex temporal evolution was seen, with high-energy peaks evolving into lower energy peaks with time.

These data provide convincing evidence that greater acetate incorporation (lower n values in A'$_2$A$_{n-1}$Pb$_n$Br$_{3n-1}$X'$_2$ final perovskite nanocrystals) results from higher $v_{HOAc}$ and lower $v_{NC}$. This is consistent with the trends uncovered by XRD and FTIR data, which show increased acetate incorporation in A'$_2$A$_{n-1}$Pb$_n$Br$_{3n-1}$X'$_2$ final perovskite nanocrystals at lower $v_{NC}$. Unlike the XRD and FTIR data, however, the PL data provides temporal evidence that acetate incorporation is preferred kinetically (stronger blueshift at early times in the time-resolved spectra in Panels A-C of FIG. 7C), whereas bromide incorporation into the perovskite nanocrystal lattice is preferred thermodynamically (redshift toward lower energy 2D structures and eventually 3D structures at later times). This kinetic preference for acetate incorporation is likely due to the significantly higher concentration of acetate relative to bromide since 0.01 M CsBr (AX) salt solutions are made in glacial acetic acid and, as discussed above, likely exist as AX' with X'=Br$^-$ or CH$_3$COO$^-$. Since evolution toward higher n values occurs over time, we conclude that the Pb(II)-Br (B—X) bond is slightly more favorable thermodynamically than the bidentate CH$_3$COO—Pb(II) (B—X') bond. Thus, though kinetics favor acetate incorporation at early times, Le Chatelier's principle ultimately governs structure obtained at equilibrium, and a high $v_{HOAc}$ relative to the number of PbBr$_2$ intermediate nanocrystals can shift the equilibrium sufficiently toward complete conversion to a single-layer n=1 A'$_2$PbBr$_2$X'$_2$ phase. Alternatively, decreasing $v_{HOAc}$ results in shifting the equilibrium toward the all-bromide 3D CsPbBr$_3$ (ABX$_3$) perovskite nanocrystal. Further tuning of the reaction conditions using variable temperature may be able to modulate the product distribution toward the several-layer A'$_2$A$_{n-1}$Pb$_n$Br$_{3n-1}$X'$_2$ final perovskite nanocrystal structures.

Finally, the presence of protons also may aid acetate versus bromide incorporation at early times (pK$_a$ 4.76 for HOAc vs. −9 for HBr in aqueous solution). The physical parameters affecting the degree of acetate incorporation is likely highly complex since evolution does not progress through isosbestic points in the time-resolved PL spectra. However, if acetate preferentially incorporates into the $A'_2A_{n-1}Pb_nBr_{3n-1}X'_2$ final perovskite nanocrystals along single planes (as suggested by XRD results above), this would result in electrically isolated 2D perovskite layers with discrete emission properties within the larger perovskite $A'_2A_{n-1}Pb_nBr_{3n-1}X'_2$ final perovskite nanocrystals. Without wishing to be bound by theory, it is hypothesized that the discrete blueshifted PL peaks at 2.49, 2.54, 2.62, 2.73, 2.85 eV result from 5, 4, 3, 2, and 1 2DN perovskite layers. For example, combining $PbBr_2$ ($BX_2$) with 2-(aminomethyl)pyridine (2-AMP) resulted in a 2D sheets made of $(H_2\text{2-AMP})PbBr_4$ that exhibited an excitonic absorption feature at 2.87 eV, very close to the 2.85 eV emission peak observed here.

Experimental Methods

Cs-Oleate Precursor Synthesis:

$CsCO_3$ (814 mg, 2.50 mmol, Aldrich, ReagentPlus, 99%), octadecene (ODE, 40 mL, Aldrich, Technical Grade, 90%), and oleic acid (2.5 mL, 7.9 mmol, Aldrich, Technical Grade, 90%) were placed in a 250 mL round-bottom flask (RBF). The mixture was heated under vacuum ($10^{-2}$ Torr) at 120° C. for 1 hour, then at 150° C. under $N_2$ while stirring with a magnetic stir bar. Heating was continued until a transparent, colorless solution was formed (~20 minutes). The temperature of the solution was 100° C. for injection.

$PbBr_2$ ($BX_2$) Precursor Synthesis:

0.274 g $PbBr_2$ (Aldrich, ≥98%) and 30 mL ODE were placed in a separate RBF. The mixture was dried under vacuum by heating at 120° C. for 1 h while stirring with a magnetic stir bar. Under $N_2$, 2 mL dry oleylamine (Aldrich, Technical Grade, 70%) and 2 mL oleic acid was injected through the septum using a syringe. Oleyamine and oleic acid were dried using 3 Å molecular sieves. After all the bulk $PbBr_2$ reacted, a transparent, colorless solution formed, at which point the temperature was raised to 170° C.

$CsPbBr_3$ ($ABX_3$) Starting Perovskite Nanocrystal Synthesis (e.g. Synthesizing Step 220 of FIG. 2):

1.6 mL of the 100° C. Cs-oleate precursor was injected with a syringe through a septum into the 170° C. $PbBr_2$ ($BX_2$) precursor to yield a bright yellow solution. The RBF was immediately removed from heat, and the reaction was quenched using an ice bath. The solution turned green and brightly luminescent upon cooling. When the temperature of the solution reached 30° C., the $CsPbBr_3$ ($ABX_3$) starting perovskite nanocrystal solution was transferred to a centrifuge tube and the $CsPbBr_3$ ($ABX_3$) starting perovskite nanocrystal solution was centrifuged at 10,000×g for 3 min. The light green supernatant was discarded, and the $CsPbBr_3$ ($ABX_3$) starting perovskite nanocrystals were dispersed in hexanes (~10 mL), then centrifuged again at 6,600×g for 3 min. The green solids were discarded. An antisolvent solution was formed by combining 1.6 mL oleic acid and 1.6 mL oleylamine with 37.5 mL acetone. 20 mL of the antisolvent solution was used to precipitate the starting perovskite nanocrystals from the hexane solution, and the cloudy suspension was centrifuged at 10,000×g for 3 min. The transparent, colorless supernatant was discarded, leaving a green precipitate.

$PbBr_2$ ($BX_2$) Intermediate Nanocrystal Preparation (e.g. First Treating Step of FIG. 2):

A CsBr (AX) extraction solution was formed by combining 9 mL ethanol (dried over 3 Å molecular sieves), 0.75 mL dry oleylamine, and 0.25 mL dry oleic acid, and 0.40 mL deionized water. We found that the variable amounts of water present in non-dried reagents did not provide reproducible results, and a known amount of water had to be added to successfully achieve $PbBr_2$ intermediate nanocrystals. The extraction solution was added to the solid $CsPbBr_3$ ($ABX_3$) starting perovskite nanocrystals and shaken or sonicated until the green powder turned white. Remaining $CsPbBr_3$ ($ABX_3$) starting perovskite nanocrystals were easily identified by green emission under UV illumination; if green emission was observed, additional shaking or sonication was performed. The resulting cloudy, white mixture was centrifuged at 10,000×g for 3 min, and the supernatant was discarded. The solid $PbBr_2$ ($BX_2$) intermediate nanocrystals were solvated in 10 mL dry toluene to yield a colorless solution. $PbBr_2$ ($BX_2$) intermediate nanocrystals solutions were stored on a Schlenk line under $N_2$ until used for further transformations.

X-Ray Diffraction:

XRD measurements were performed on a Bruker D8 Discover X-ray Diffraction system with a 2.2 kW sealed Cu X-ray source. Patterns were acquired by depositing precipitated NCs onto a glass slide and scanning over 2θ using a beam voltage and current of 40 kV and 35 mA, respectively. Simulated powder diffraction patterns were generated using VESTA version 3.4 with .cif files from references[32-34].

$A'_2A_{n-1}Pb_nBr_{3n-1}X'_2$ Synthesis (e.g. Second Treating 250 Step of FIG. 2):

0.01 M solutions of A'X' salts were formed in glacial acetic acid. Transformation of $PbBr_2$ ($BX_2$) intermediate nanocrystals was performed by combining 0.1 mL A'X' solution with 0.025 mL oleylamine, 0.025 mL oleic acid, and varying amounts of additional acetic acid and $PbBr_2$ ($BX_2$) intermediate nanocrystals solution as described above. Toluene was added to reach a total volume of 2.5 mL, which was held constant for all transformations. Each reagent was stored over 3 Å molecular sieves overnight before use.

Transmission Electron Microscopy (TEM):

Images were acquired on an FEI ST30 TEM operated at 300 kV. Samples were prepared by dropping dilute toluene solutions of NCs onto ultrathin carbon film/holey carbon, 400 mesh copper TEM grids.

Fourier Transform Infrared Spectroscopy (FTIR):

Spectra were acquired on a Bruker Alpha FTIR spectrometer inside an Ar-atmosphere glovebox. Spectra of NC samples were obtained in diffuse reflectance mode. Samples were prepared by depositing centrifuged powder onto an aluminum- or gold-coated Si wafer. Spectra were collected by averaging 50 scans at 2 $cm^{-1}$ resolution. Spectra of neat oleic acid and oleylamine liquids were acquired in attenuated total reflectance mode on the same spectrometer by depositing a drop of the liquid onto a diamond ATR crystal and collecting spectra by averaging 50 scans at 2 $cm^{-1}$ resolution.

Photoluminescence Spectroscopy:

Emission measurements were acquired using an Ocean-Optics OceanFX fiber-optically coupled Silicon CCD array. The OceanFX was controlled with custom LabVIEW software that allows extremely long averaging times (from ms to h) while maintaining a correct dark signal by using a light on-off acquisition sequence with a shutter cycle time of a few hundred ms. A ThorLabs M405FP1 fiber coupled 405 nm LED provided the light source, controlled by a ThorLabs DC2200 high power LED Driver. Typical output power after coupling was around 250 mW, which was allowed to have two passes through the sample by the use of a mirror on the back side of the cuvette. Typical acquisition times for photoluminescence were an integration time of 100 ms and an averaging time of a few min. The spectral sensitivity of the detector was calibrated against the HL2000-HP tungsten halogen lamp, assuming it is a perfect blackbody with a temperature of 3000 K.

COMPOSITION EXAMPLES

Example 1

A perovskite sheet comprising: two outer layers, each comprising A'X'; and a first layer comprising $BX_2$, wherein: B is a first cation, A' is a second cation, X is a first anion, X' is a second anion, and the first $BX_2$ layer is positioned between the two outer layers.

Example 2

The perovskite sheet of Example 1, further comprising: a first layer comprising AX; and a second $BX_2$ layer, wherein: A is a third cation, the second $BX_2$ layer is positioned between the outer layers, and the first AX layer is positioned between the first $BX_2$ layer and the second $BX_2$ layer.

Example 3

The perovskite sheet of Example 2, further comprising: a second AX layer, and a third $BX_2$ layer, wherein: the second AX layer and the third $BX_2$ are positioned between the outer layers, each outer layer is adjacent to a $BX_2$ layer, and the $BX_2$ layers and AX layers alternate positions in the sheet.

Example 4

The perovskite sheet of Example 3, further comprising: n $BX_2$ layers, wherein: n is greater than three, and the outer layers, the $BX_2$ layers, and the AX layers result in a stoichiometry defined by $A'_2A_{n-1}B_nX_{3n-1}X'_2$.

Example 5

The perovskite sheet of Example 1, wherein A comprises at least one of an alkylammonium cation, formamidinium ($NH_2CH=NH_2^+$), $H^+$, or $Cs^+$.

Example 6

The perovskite sheet of Example 5, wherein the alkylammonium cation comprises at least one of methylammonium ($CH_3NH_3^+$), ethylammonium ($CH_3CH_2NH_3^+$), propylammonium ($CH_3CH_2CH_2NH_3^+$), or butylammonium ($CH_3CH_2CH_2CH_2NH_3^+$).

Example 7

The perovskite sheet of Example 1, wherein A' comprises at least one of an alkylammonium cation, formamidinium ($NH_2CH=NH_2^+$), $H^+$, or $Cs^+$.

Example 8

The perovskite sheet of Example 7, wherein the alkylammonium cation comprises at least one of methylammonium ($CH_3NH_3^+$), ethylammonium ($CH_3CH_2NH_3^+$), propylammonium ($CH_3CH_2CH_2NH_3^+$), or butylammonium ($CH_3CH_2CH_2CH_2NH_3^+$).

Example 9

The perovskite sheet of Example 1, wherein B comprises at least one of lead, tin, or germanium.

Example 10

The perovskite sheet of Example 1, wherein X comprises at least one of fluorine, chlorine, bromine, or iodine.

Example 11

The perovskite sheet of Example 1, wherein X' comprises at least one of fluorine, chlorine, bromine, iodine, or acetate.

Example 12

The perovskite sheet of Example 1, wherein X' comprises a charged form of at least one of a phosphonate group, a carboxylate group, a thiolate, a thiocyanate, an isocyanate, a carbonate, a chromate, a phosphate, a sulfite, a hydroxide, a nitrite, a percholorate.

Example 13

The perovskite sheet of Example 12, wherein X' comprises at least one of includes acetate, propionate, butyrate, phenolate, formate, an alkylphosphonate, or an alkylthiolate.

Example 14

The perovskite sheet of Example 12, wherein X' comprises at least one of methylphosphonate, ethylphosphonate, phenylphosphonate, butanethiolate, hexanethiolate, or phenylthiolate.

Example 15

The perovskite sheet of Example 1, wherein A'X' is cesium acetate.

Example 16

The perovskite sheet of Example 1, wherein AX is cesium bromide.

Example 17

The perovskite sheet of Example 1, wherein $BX_2$ is $PbBr_2$.

Example 18

The perovskite sheet of Example 4, wherein $A'_2A_{n-1}B_nX_{3n-1}X'_2$ is $Cs_{1-n}Pb_nBr_{3n-1}(CH_3O_2)_2$.

Example 19

The perovskite sheet of Example 4, wherein $4 \leq n \leq 10,000$.

Example 20

The perovskite sheet of Example 19, wherein $4 \leq n \leq 1,000$.

Example 21

The perovskite sheet of Example 20, wherein $4 \leq n \leq 100$.

Example 22

The perovskite sheet of Example 1, wherein the perovskite sheet comprises a nanocrystal.

Example 23

The perovskite sheet of Example 22, wherein the nanocrystal has a characteristic length between about 1 nm and about 50 nm.

Example 24

The perovskite sheet of Example 23, wherein the characteristic length is between about 6 nm and about 20 nm.

Example 25

The perovskite sheet of Example 22, wherein the nanocrystal is suspended in a solution comprising a first solvent.

Example 26

The perovskite sheet of Example 25, wherein: the first solvent has a first solubility for A'X', the first solvent has a second solubility for $BX_2$, the first solubility is higher than the second solubility.

Example 27

The perovskite sheet of Example 26, wherein the first solvent comprises at least one of an alcohol, a carboxylic acid, a ketone, a nitrile, water, or toluene.

Example 28

The perovskite sheet of Example 27, wherein the first solvent comprises at least one of acetic acid or formic acid.

Example 29

The perovskite sheet of Example 25, wherein the solution further comprises a second solvent.

Example 30

The perovskite sheet of Example 29, wherein the second solvent comprises a nonpolar solvent.

Example 31

The perovskite sheet of Example 30, wherein the nonpolar solvent comprises at least one of hexane, toluene, or benzene.

Example 32

The perovskite sheet of Example 29, wherein the solution further comprises a ligand comprising a binding group, where the binding group is physically associated with a surface of the nanocrystal.

Example 33

The perovskite sheet of Example 32, wherein the physical association comprises at least one of an ionic bond, a hydrogen bond, or van der Waals forces.

Example 34

The perovskite sheet of Example 32, wherein the ligand comprises a hydrocarbon having four or more carbon atoms.

Example 35

The perovskite sheet of Example 32, wherein the binding group comprises a neutral group comprising at least one of a hydroxyl group, an epoxide, an aldehyde, a ketone, a carboxylic acid, an acid anhydride, an ester, an amide, an acyl halide, an amine, a nitrile, an imine, an isocyanate, or a thiol.

Example 36

The perovskite sheet of Example 35, wherein the binding group comprises a charged form of the neutral group.

Example 37

The perovskite sheet of Example 36, wherein the ligand comprises at least one of oleylamine, oleylammonium, phenylammonium, or dodecylammonium.

Example 38

The perovskite sheet of Example 32, wherein the nanocrystal emits light when exposed to UV light.

Example 39

The perovskite sheet of Example 38, wherein the light is at an energy level between about 1.7 eV and about 3.0 eV.

Example 40

The perovskite sheet of Example 39, wherein the energy level is between about 2.2 eV and about 2.5 eV when A' and A both comprise $Cs^+$.

Example 41

The perovskite sheet of Example 39, wherein the energy level is between about 2.15 eV and about 2.45 eV when A' comprises $FA^+$ and A comprises $Cs^+$.

Example 42

The perovskite sheet of Example 39, wherein the energy level is between about 2.10 eV and about 2.40 eV when A' comprises $MA^+$ and A comprises $Cs^+$.

Example 43

A perovskite sheet comprising: a first outer layer comprising A'X'; and a second outer layer comprising $A'_2BX_2X'_2$, wherein: B is a first cation, A' is a second cation, X is a first anion, X' is a second anion, and the first outer layer and the second outer layer are adjacent to one another.

Example 44

The perovskite sheet of Example 43, further comprising a first $ABX_3$ layer positioned between the two outer layers, wherein A is a third cation.

Example 45

The perovskite sheet of Example 44, further comprising a second $ABX_3$ layer positioned between the two outer layers.

Example 46

The perovskite sheet of Example 45, further comprising: (n−1) $ABX_3$ layers, wherein: n is greater than three, and the outer layers and the $ABX_3$ layers result in a stoichiometry defined by $A'_2A_{n-1}B_nX_{3n-1}X'_2$.

Example 47

A perovskite network comprising: a first perovskite sheet having the stoichiometry of $A'_2A_{n-1}B_nX_{3n-1}X'_2$, and a second perovskite sheet having the stoichiometry of $A'_2A_{m-1}B_mX_{3m-1}X'_2$, wherein: B is a first cation, A' is a second cation, A is a third cation, X is a first anion, and X' is a second anion, the first perovskite sheet and the second perovskite sheet each comprise an A'X' layer, the A'X' layer of the first perovskite sheet is physically associated with the A'X' layer of the second perovskite sheet, and m does not equal n, m is greater than or equal to zero, and n is greater than or equal to one.

Example 48

The perovskite of Example 47, wherein the physical association comprises at least one an ionic bond, a hydrogen bond, or van der Waals forces.

Example 49

A perovskite network comprising: a first perovskite sheet having the stoichiometry of $A'_2A_{n-1}Pb_nBr_{3n-1}X"$, and a second perovskite sheet having the stoichiometry of $A'_2A_{m-1}Pb_mBr_{3m-1}X"$, wherein: B is a first cation, A' is a second cation, A is a third cation, X is a first anion, and X" is a second anion, the first perovskite sheet and the second perovskite sheet are physically associated by sharing at least one X", and m does not equal n, m is greater than or equal to zero, and n is greater than or equal to one.

Example 50

The perovskite of Example 49, wherein the physical association comprises at least one an ionic bond, a hydrogen bond, or van der Waals forces.

METHOD EXAMPLES

Example 1

A method for making a perovskite, the method comprising: removing A and X from a first nanocrystal comprising $ABX_3$, resulting in the forming of a second nanocrystal comprising $BX_2$; contacting the second nanocrystal with A'X', resulting in the forming of third nanocrystal comprising $A'_2A_{n-1}B_nX_{3n-1}X'_2$, wherein: B is a first cation, A' is a second cation, A is a third cation, X is a first anion, and X' is a second anion.

Example 2

The method of Example 1, wherein: the removing is achieved by immersing the first nanocrystal in a first solution comprising a first solvent, the first solution has a first solubility for the A and the X, the first solution has a second solubility for the second nanocrystal, and the first solubility is higher than the second solubility.

Example 3

The method of Example 2, wherein the first solvent comprises at least one of water, an alcohol, ether, a halogenated alkane, a halogenated benzene, a ketone, an alkylnitrile, or an ester.

Example 4

The method of Example 3, wherein the first solvent comprises water and ethanol.

Example 5

The method of Example 2, wherein the first solution further comprises a ligand comprising a binding group associated with a surface of the first nanocrystal.

Example 6

The method of Example 5, wherein the ligand comprises a hydrocarbon having four or more carbon atoms.

Example 7

The method of Example 5, wherein the ligand comprises a hydrocarbon having four or more carbon atoms.

Example 8

The method of Example 5, the binding group comprises a neutral group comprising at least one of a hydroxyl group, an epoxide, an aldehyde, a ketone, a carboxylic acid, an acid anhydride, an ester, an amide, an acyl halide, an amine, a nitrile, an imine, an isocyanate, or a thiol.

Example 9

The method of Example 8, wherein the binding group comprises a charged form of the neutral group.

Example 10

The method of Example 9, wherein the ligand comprises at least one of oleylamine, oleylammonium, phenylammonium, or dodecylammonium.

Example 11

The method of Example 1, wherein the removing is performed by at least one of filtration, centrifugation, or gravity separation.

Example 12

The method of Example 1, wherein: the contacting is performed by adding the A'X' in a second solution comprising a second solvent, the second solvent has a third solubility for A'X', the second solvent has a fourth solubility for $BX_2$, and the third solubility is higher than the fourth solubility.

Example 13

The method of Example 12, wherein the second solvent comprises at least one of a carboxylic acid, a halogenated arene, a ketone, a nitrile, or toluene.

Example 14

The method of Example 13, wherein the second solvent comprises at least one of acetic acid or formic acid.

Example 15

The method of Example 12, wherein the second solution further comprises a nonpolar solvent.

Example 16

The method of Example 15, wherein the nonpolar solvent comprises at least one hexane, toluene, or benzene.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:
1. A perovskite sheet comprising, in order:
a first layer comprising A'X';
a second layer comprising $BX_2$;
a third layer comprising AX;
a fourth layer comprising $BX_2$; and
a fifth layer comprising A'X', wherein:
B is a first cation comprising lead,
A' is a second cation comprising at least one of hydrogen, methylammonium (MA), formamidinium (FA), or cesium,
A is a third cation comprising at least one of MA, FA, or cesium,
X is a first anion comprising bromide,
X' is a second anion comprising at least one of bromide or acetate (AC), and
the first layer and the fifth layer form interlayers between neighboring perovskite sheets, wherein:
the perovskite sheet has a composition comprising $A'_2AB_2X_5X'_2$.

2. The perovskite sheet of claim 1, further comprising:
a sixth layer comprising AX, and
a seventh layer comprising $BX_2$, wherein:
the second AX layer and the third $BX_2$ are positioned between the first layer and the fifth layer,
the first layer is adjacent to a first $BX_2$ layer,
the fifth layer is adjacent to a second $BX_2$ layer, and
the $BX_2$ layers and AX layers alternate positions in the sheet, wherein:
the perovskite sheet has a composition comprising $A'_2A_2B_3X_8X'_2$.

3. The perovskite sheet of claim 2, further comprising:
n $BX_2$ layers, wherein:
n is greater than three, and
the outer layers, the $BX_2$ layers, and the AX layers result in a stoichiometry defined by $A'_2A_{n-1}B_nX_{3n-1}X'_2$.

4. The perovskite sheet of claim 3, wherein $4 \leq n \leq 10,000$.

5. The perovskite sheet of claim 1, wherein B further comprises at least one of tin or germanium.

6. The perovskite sheet of claim 1, wherein X further comprises at least one of fluoride, chloride, or iodide.

7. The perovskite sheet of claim 1, wherein X' further comprises a charged form of at least one of a phosphonate group, a carboxylate group, a thiolate, a thiocyanate, an isocyanate, a carbonate, a chromate, a phosphate, a sulfite, a hydroxide, a nitrite, or a percholorate.

8. The perovskite sheet of claim 7, wherein X' comprises at least one of acetate, propionate, butyrate, phenolate, formate, an alkylphosphonate, or an alkylthiolate.

9. The perovskite sheet of claim 1, wherein the perovskite sheet comprises a nanocrystal.

10. The perovskite sheet of claim 9, wherein the nanocrystal is suspended in a solution comprising a solvent.

11. The perovskite sheet of claim 10, wherein the solution further comprises a ligand comprising a binding group, where the binding group is physically associated with a surface of the nanocrystal.

12. The perovskite sheet of claim 11, wherein the nanocrystal emits light when exposed to UV light.

13. The perovskite sheet of claim 12, wherein the light is at an energy level between about 1.7 eV and about 3.0 eV.

14. A perovskite network comprising:
a first perovskite sheet having the stoichiometry of $A'_2A_{n-1}B_nX_{3n-1}X'_2$, and
a second perovskite sheet having the stoichiometry of $A'_2A_{m-1}B_mX_{3m-1}X'_2$, wherein:
B is a first cation comprising lead,
A' is a second cation comprising at least one of hydrogen, methylammonium (MA), formamidinium (FA), or cesium,
A is a third cation comprising at least one of MA, FA, or cesium,
X is a first anion comprising bromide,
X' is a second anion comprising at least one of bromide or acetate,
the first perovskite sheet and the second perovskite sheet each comprise an A'X' layer,
the A'X' layer of the first perovskite sheet is physically associated with the A'X' layer of the second perovskite sheet, and
m does not equal n, m is greater than or equal to zero, and n is greater than or equal to one.

15. A perovskite network comprising:
a first perovskite sheet having the stoichiometry of $A'_2A_{n-1}Pb_nBr_{3n-1}X''$, and
a second perovskite sheet having the stoichiometry of $A'_2A_{m-1}Pb_mBr_{3m-1}X''$, wherein:
B is a first cation comprising lead,
A' is a second cation comprising at least one of hydrogen, methylammonium (MA), formamidinium (FA), or cesium,
A is a third cation comprising at least one of MA, FA, or cesium,
X is a first anion comprising bromide,
X" is a second anion comprises terephthalate,
the first perovskite sheet and the second perovskite sheet are physically associated by sharing at least one X", and
m does not equal n, m is greater than or equal to zero, and n is greater than or equal to one.

16. A method for making a perovskite, the method comprising:
removing A and X from a first nanocrystal comprising $ABX_3$, resulting in the forming of a second nanocrystal comprising $BX_2$; and
contacting the second nanocrystal with A'X', resulting in the forming of a third nanocrystal comprising $A'_2A_{n-1}B_nX_{3n-1}X'_2$, wherein:
n is greater than or equal to two,
the third nanocrystal includes a perovskite sheet comprising:
a first layer comprising A'X';
a second layer comprising $BX_2$;
a third layer comprising AX;
a fourth layer comprising $BX_2$; and
a fifth layer comprising A'X',
B is a first cation comprising lead,
A' is a second cation comprising at least one of hydrogen, methylammonium (MA), formamidinium (FA), or cesium,
A is a third cation comprising at least one of MA, FA, or cesium,
X is a first anion comprising bromide,
X' is a second anion comprising at least one of bromide or acetate, and
the first layer and the fifth layer form interlayers between neighboring perovskite sheets.

17. The method of claim 16, wherein:
the removing is achieved by immersing the first nanocrystal in a first solution comprising a first solvent,
the first solution has a first solubility for the A and the X,
the first solution has a second solubility for the second nanocrystal, and
the first solubility is higher than the second solubility.

18. The method of claim 17, wherein the first solvent comprises at least one of water, an alcohol, ether, a halogenated alkane, a halogenated benzene, a ketone, an alkylnitrile, or an ester.

19. The perovskite sheet of claim 1, wherein the first layer and the fifth layer are substantially free of a ligand.

20. The perovskite sheet of claim 19, wherein the ligand comprises at least one of oleic acid, oleylamine, oleylammonium, phenylammonium, or dodecylammonium.

21. The perovskite sheet of claim 1, comprising at least one of $MA_2CsPb_2Br_5Ac_2$, $FA_2CsPb_2Br_5Ac_2$, $H_2CsPb_2Br_5Ac_2$, $MA_2CsPb_2Br_7$, $FA_2CsPb_2Br_7$, $H_2CsPb_2Br_7$, $Cs_3Pb_2Br_7$, $Cs_3Pb_2Br_5Ac_2$, $Cs_3Pb_2Br_5Ac_2$, or $Cs_3Pb_2Br_5Ac_2$.

* * * * *